(12) United States Patent
Garcia, III et al.

(10) Patent No.: US 11,704,708 B2
(45) Date of Patent: Jul. 18, 2023

(54) SYSTEMS AND METHODS FOR GENERATING VIRTUAL ITEM DISPLAYS

(71) Applicant: Carvana, LLC, Tempe, AZ (US)

(72) Inventors: Ernest C. Garcia, III, Tempe, AZ (US); Nicole Behrens, Tempe, AZ (US); Adam Swofford, Tempe, AZ (US)

(73) Assignee: Carvana, LLC, Tempe, AZ (US)

( * ) Notice: Subject to any disclaimer, the term of this patent is extended or adjusted under 35 U.S.C. 154(b) by 0 days.

(21) Appl. No.: 16/569,826

(22) Filed: Sep. 13, 2019

(65) Prior Publication Data

US 2020/0005372 A1  Jan. 2, 2020

Related U.S. Application Data

(63) Continuation of application No. 15/228,027, filed on Aug. 4, 2016, now Pat. No. 10,423,995, which is a (Continued)

(51) Int. Cl.
G06T 13/80 (2011.01)
H04N 7/18 (2006.01)
(Continued)

(52) U.S. Cl.
CPC ......... *G06Q 30/0609* (2013.01); *G03B 37/02* (2013.01); *G06Q 30/0641* (2013.01); *G06Q 30/0643* (2013.01); *G06Q 40/03* (2023.01); *G06T 11/60* (2013.01); *G06T 13/00* (2013.01); *G06T 13/80* (2013.01); *G06T 19/006* (2013.01); *H04N 5/2224* (2013.01); *H04N 7/181* (2013.01); *H04N 23/56* (2023.01); *H04N 23/661* (2023.01); *H04N 23/698* (2023.01); *H04N 23/90* (2023.01);
(Continued)

(58) Field of Classification Search
None
See application file for complete search history.

(56) References Cited

U.S. PATENT DOCUMENTS 6,901,384 B2   5/2005  Lynch et al.
6,950,807 B2   9/2005  Brock
(Continued)

OTHER PUBLICATIONS

In Re Venner et al., No. 6391, LexisNexis; United States Court of Customs and Patent Appeals; Oral argument Nov. 7, 1958, Dec. 19, 1958.
(Continued)

*Primary Examiner* — Talha M Nawaz
(74) *Attorney, Agent, or Firm* — Snell & Wilmer L.L.P.

(57) ABSTRACT

Systems, methods, and devices of the various embodiments enable virtual displays of an item, such as vehicle, to be generated. In an embodiment, a plurality of images of an item may be captured and annotation may be provided to one or more of the images. In an embodiment, the plurality of images may be displayed, and the transition between each of the plurality of images may be an animated process. In an embodiment, an item imaging system may comprise a structure including one or more cameras and one or more lights, and the item imaging system may be configured to automate at least a portion of the process for capturing the plurality of images of an item.

20 Claims, 26 Drawing Sheets

Related U.S. Application Data continuation of application No. 14/161,254, filed on Jan. 22, 2014, now Pat. No. 9,412,203.

(60) Provisional application No. 61/830,963, filed on Jun. 4, 2013, provisional application No. 61/793,445, filed on Mar. 15, 2013, provisional application No. 61/755,384, filed on Jan. 22, 2013.

(51) Int. Cl.
| | |
|---|---|
| *H04N 5/222* | (2006.01) |
| *G06Q 30/0601* | (2023.01) |
| *G06T 19/00* | (2011.01) |
| *G06T 13/00* | (2011.01) |
| *G03B 37/02* | (2021.01) |
| *G06Q 40/03* | (2023.01) |
| *H04N 23/56* | (2023.01) |
| *H04N 23/90* | (2023.01) |
| *H04N 23/661* | (2023.01) |
| *H04N 23/698* | (2023.01) |
| *G06T 11/60* | (2006.01) |
| *G03B 17/56* | (2021.01) |
| *G06F 3/0482* | (2013.01) |

(52) U.S. Cl.
CPC .......... *G03B 17/561* (2013.01); *G06F 3/0482* (2013.01); *G06F 2203/04806* (2013.01); *G06T 2200/24* (2013.01)

(56) References Cited

U.S. PATENT DOCUMENTS

| | | | | |
|---|---|---|---|---|
| 8,041,409 B2 * | 10/2011 | Leevy | ................. | A61B 5/0035 |
| | | | | 600/407 |
| 8,050,735 B2 * | 11/2011 | Feke | ................. | A61B 5/0059 |
| | | | | 600/407 |
| 9,037,968 B1 * | 5/2015 | Pringle | ................. | A63F 13/55 |
| | | | | 715/273 |
| 9,113,784 B2 * | 8/2015 | Feke | ................. | A61B 6/5247 |
| 9,302,190 B1 * | 4/2016 | Jennings | ................. | A63G 31/02 |
| 2001/0020933 A1 * | 9/2001 | Maggioni | ................. | G06F 3/0428 |
| | | | | 345/156 |
| 2002/0082860 A1 | 6/2002 | Johnson | | |
| 2002/0085219 A1 | 7/2002 | Ramamoorthy | | |
| 2002/0105513 A1 | 8/2002 | Chen | | |
| 2003/0107568 A1 * | 6/2003 | Urisaka | ................. | G06T 17/00 |
| | | | | 345/419 |
| 2004/0078298 A1 * | 4/2004 | Fusama | ................. | G06Q 30/06 |
| | | | | 348/E5.042 |
| 2005/0174473 A1 * | 8/2005 | Morgan | ................. | H05B 45/355 |
| | | | | 348/370 |
| 2006/0185550 A1 * | 8/2006 | Zanzucchi | ................. | A63B 24/0021 |
| | | | | 101/484 |
| 2006/0256959 A1 | 11/2006 | Hymes | | |
| 2007/0011083 A1 | 1/2007 | Bird et al. | | |
| 2007/0035539 A1 * | 2/2007 | Matsumura | ................. | G06T 7/564 |
| | | | | 345/419 |
| 2007/0172216 A1 | 7/2007 | Lai | | |
| 2007/0211240 A1 * | 9/2007 | Matsumoto | ................. | G01N 21/9515 |
| | | | | 356/237.1 |
| 2007/0230824 A1 | 10/2007 | Alvarez | | |
| 2008/0106593 A1 | 5/2008 | Arfvidsson et al. | | |
| 2008/0187182 A1 * | 8/2008 | Abe | ................. | G06V 40/12 |
| | | | | 382/115 |
| 2009/0160930 A1 | 6/2009 | Ruppert | | |
| 2010/0134695 A1 * | 6/2010 | O'Connell | ................. | G03B 15/00 |
| | | | | 348/789 |
| 2010/0306413 A1 | 12/2010 | Kamay | | |
| 2011/0317394 A1 * | 12/2011 | Van Campen | ................. | G03B 15/06 |
| | | | | 362/16 |
| 2013/0266301 A1 * | 10/2013 | Hedenberg | ................. | E04H 15/54 |
| | | | | 396/1 |
| 2014/0152806 A1 * | 6/2014 | Hauk | ................. | G03B 37/02 |
| | | | | 348/121 |
| 2014/0192181 A1 | 7/2014 | Taylor et al. | | |
| 2014/0268627 A1 * | 9/2014 | Contreras, Jr. | ................. | F21V 21/005 |
| | | | | 362/11 |
| 2015/0111601 A1 | 4/2015 | Fagan | | |
| 2015/0227296 A1 * | 8/2015 | Pringle | ................. | G06F 40/106 |
| | | | | 715/760 |
| 2016/0100087 A1 * | 4/2016 | Scheich | ................. | H04N 23/56 |
| | | | | 348/47 |
| 2017/0163937 A1 * | 6/2017 | McNelley | ................. | H04N 7/144 |
| 2017/0180696 A1 * | 6/2017 | Broughton | ................. | G06Q 30/0621 |
| 2018/0084224 A1 * | 3/2018 | McNelley | ................. | H04N 7/15 |
| 2019/0235757 A1 * | 8/2019 | Kuribayashi | ................. | G02B 30/56 |
| 2021/0255524 A1 * | 8/2021 | O'Connell | ................. | G03B 35/00 |
| 2021/0392290 A1 * | 12/2021 | McNelley | ................. | H04N 9/3141 |
| 2022/0299844 A1 * | 9/2022 | O'Connell | ................. | G03B 35/00 |

OTHER PUBLICATIONS

Credit Acceptance Corp, Guaranteed Credit Approval, Auto Loan; http://www.insider-car-buying-tips.com/credit_acceptance_corp.html; accessed Dec. 17, 2013.

Auto Success; Credit Acceptance's Upgraded Credit Approval Processing System Simplifies Approval Process; vol. 1 Issue 33; http://www.imakenews.com/autosuccess/e_article001075242.cfm?x=bgB6Vlj,b7jJcq29,w; accessed Dec. 17, 2013.

Credit Acceptance Corp (CACC.OQ) Company Profile | Reuters.com; http://www.reuters.com/finance/stocks/companyProfile?symbol=CACC.OQ; accessed Dec. 17, 2013.

Credit Acceptance Corporation—Annual Report; United States Securities and Exchange Commission; Washington D. C. 20549; Form 10-K; Annual Report Pursuant to Section 13 or 15(d) of the Securities Exchange Act of 1934. http://www.ir.creditacceptance.com/secfiling.cfm?filingID=885550-13-18&CIK=885550; accessed Dec. 17, 2013.

* cited by examiner

SYSTEMS AND METHODS FOR GENERATING VIRTUAL ITEM DISPLAYS

RELATED APPLICATIONS

The present application is a continuation of U.S. Non-Provisional application Ser. No. 15/228,027 entitled "Systems and Methods for Generating Virtual Item Displays" filed Aug. 4, 2016 which is a continuation of U.S. Non-Provisional application Ser. No. 14/161,254, entitled "Systems and Methods for Generating Virtual Item Displays" filed Jan. 22, 2014, now U.S. Pat. No. 9,412,203 issued Aug. 9, 2016 which claims the benefit of priority to U.S. Provisional Application No. 61/755,384, entitled "Methods and Systems for Online Transactions" filed Jan. 22, 2013, U.S. Provisional Application No. 61/793,445, entitled "Methods and Systems for Online Transactions" filed Mar. 15, 2013, and U.S. Provisional Application No. 61/830,963, entitled "Methods and Systems for Online Transactions" filed Jun. 4, 2013. The entire contents of all five applications are hereby incorporated by reference.

BACKGROUND

Purchasing an item, such as a vehicle, may be time consuming and complex. Typically, a buyer must meet with a seller in person to inspect the item, and only after the results of the in person inspection are satisfactory to the buyer is the contract closed and does the buyer take possession of the item. Often the results of the in person inspection are non-satisfactory to the buyer resulting in lost time for both the buyer and seller because the contract may not be closed.

SUMMARY

The systems, methods, and devices of the various embodiments enable virtual displays of an item, such as a vehicle, to be generated. In an embodiment, a plurality of images of an item may be captured and annotation may be provided to one or more of the images. In an embodiment, the plurality of images may be displayed, and the transition between each of the plurality of images may be an animated process. In an embodiment, an item imaging system may comprise a structure including one or more cameras and one or more lights, and the item imaging system may be configured to automate at least a portion of the process for capturing the plurality of images of an item.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
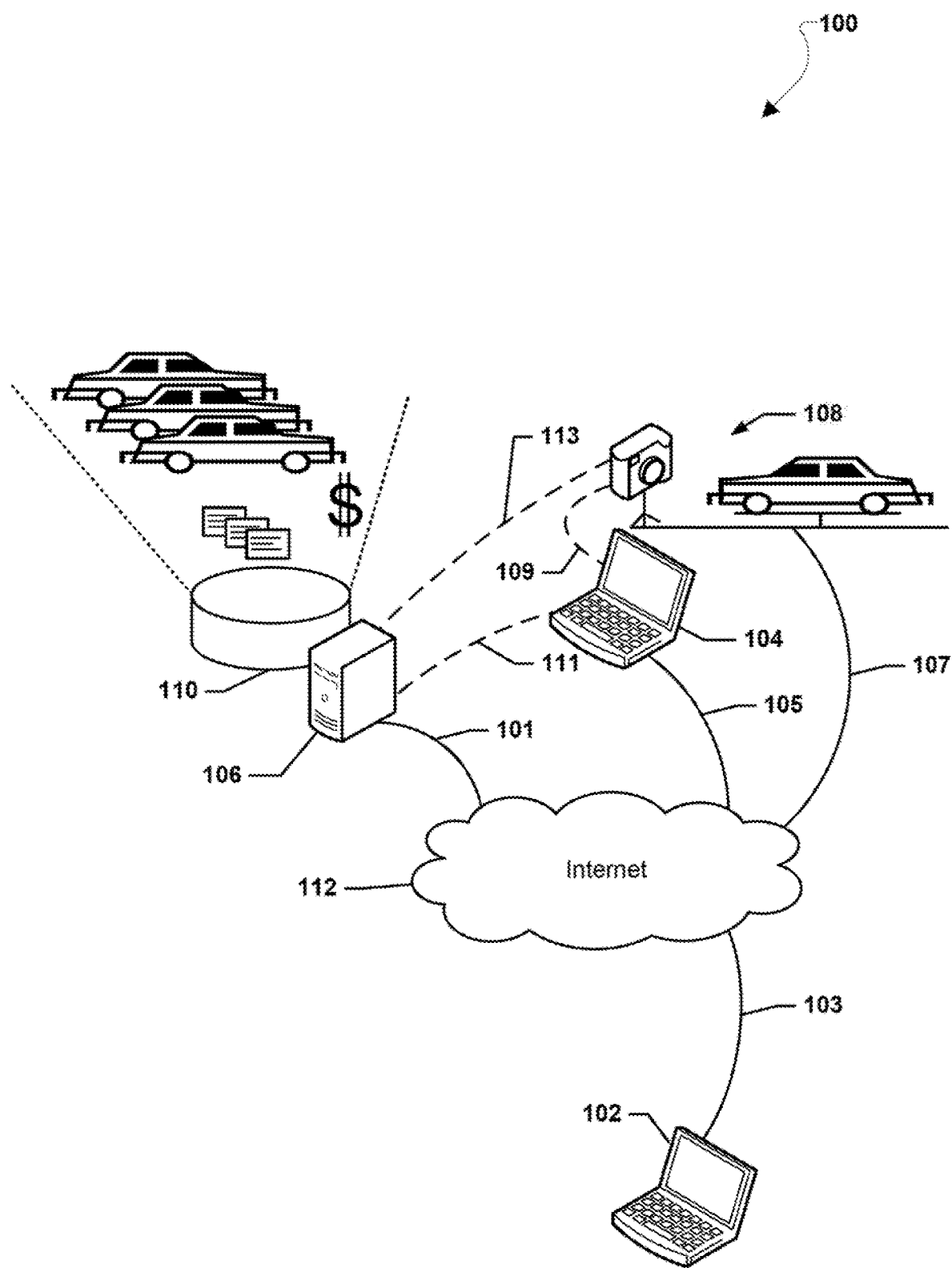
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "computing device" is used to refer to any one or all of desktop computers, cellular telephones, smart phones, personal or mobile multi-media players, personal data assistants (PDA's), laptop computers, tablet computers, smart books, retail terminals, palm-top computers, wireless electronic mail receivers, multimedia Internet enabled cellular telephones, wireless gaming controllers, and similar electronic devices which include a programmable processor and memory and circuitry for receiving user input and rendering data, such as web pages, images, etc.

The various embodiments are described herein using the term "server." The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device, such as a smart phone, thereby enabling it to function as an Internet server (e.g., an enterprise e-mail server) only to the extent necessary to provide the functionality described herein.

The systems, methods, and devices of the various embodiments enable virtual displays of an item, such as a vehicle, to be generated. In an embodiment, a plurality of images of an item may be captured and annotation may be provided to one or more of the images. In an embodiment, the plurality of images may be displayed, and the transition between each of the plurality of images may be an animated process. In an embodiment, an item imaging system may comprise a structure including one or more cameras and one or more lights, and the item imaging system may be configured to automate at least a portion of the process for capturing the plurality of images of an item.

In the various embodiments, an item imaging system (e.g., an image capture area or photo booth) may comprise a roundhouse and/or a hot box. As an example, the roundhouse may be a dome structure that has three cameras and fifty or more lights built around a vehicle turntable. A roundhouse may be used to capture exterior photos of a vehicle. As another example, the hot box may be a structure that includes a vehicle lift and a panoramic camera mounted on an arm. A hot box may be used to capture interior photos of a vehicle. In order to allow for repeated photography under uniform conditions in an efficient time table, the two photography stations (i.e., the roundhouse and hot box) may be used in conjunction with one another to capture external and internal images of an item, such as a vehicle. One or both of the roundhouse and hot box may be operated automatically, and may require only one operator per station to initiate the photographic process at each station. One or both the roundhouse and hot box may employ one or more cameras, several mechanical devices, and complex lighting set ups. The automated processes enabled by the roundhouse and/or the hot box may reduce the time of capture for images of a vehicle from hours when done manually with current systems to minutes when utilizing the roundhouse and/or hot box.

FIG. 1 illustrates a network system 100 suitable for use with the various embodiments. For ease of discussion, many of the embodiments are discussed in relation to motor vehicles. However, the embodiments discussed herein may be applied to any of a variety of items. The network system 100 may include multiple devices, such as a one or more buyer computing device 102, one or more seller server 106, one or more annotator computing device 104, and one or more item imaging system 108 connected to a network, such as the Internet 112. As an example, the buyer computing device 102 may be a laptop, tablet, desktop, smartphone, etc., operated by a buyer intending to shop for and/or purchase a vehicle. The buyer computing device 102 may include a network interface enabling the buyer computing device 102 to establish a network connection 103, such as a wired or wireless connection via a router and/or base station, to a network, such as the Internet 112.

The seller server 106 may be part of a financial and inventory management system which may include a database 110 of seller information (e.g., seller records), inventory information, (e.g., seller inventory records), and/or financial information (e.g., financing records), and the seller server 106 may manage/update the information within the database 110 and/or make the information from the database 110 available to other devices as well as perform operations using the information within the database 110 and provided from other devices. As an example, the seller server 106 may host a web portal accessible as a series of web pages enabling access to the database 110 and providing results of operations performed by the seller server 106. As a specific example, the seller server 106 may host a series of web pages enabling a buyer computing device 102 to retrieve and render images of one or more vehicles for sale, thereby enabling an interactive tour of a virtual display of the vehicle to be conducted by a buyer operating the buyer computing device 102. The seller server 106 may include a network interface enabling the seller server 106 to establish a network connection 101, such as a wired or wireless connection via a router and/or base station, to a network, such as the Internet 112.

The item imaging system 108 may be systems comprised of one or more cameras, lights, lifts, turntables, structures, processors, etc., configured to generate one or more image of an item, such as a vehicle. As an example, the item imaging system 108 may be comprised of a series of structures, such as a Roundhouse and Hot Box, including cameras, lights, and processors, configured to generate images of the inside and outside of a vehicle for use in generating a virtual display of the vehicle. The item imaging system 108 may include a network interface enabling the item imaging system 108 to establish a network connection 107, such as a wired or wireless connection via a router and/or base station, to a network, such as the Internet 112. The item imaging system 108 may optionally include a connection 109 and/or a connection 113, such as wired and/or wireless connections, directly to the annotator computing device 104 and/or the seller server 106.

The annotator computing device 104 may be a computing device, such as a laptop or desktop computer, enabling an operator, such as an employee of a vehicle seller, to annotate images of vehicle. For example, the images may be images of a vehicle generated by the item imaging system 108, received from the item imaging system 108 and/or the seller server 106. The annotator computing device 104 may include a network interface enabling the annotator computing device 104 to establish a network connection 105, such as a wired or wireless connection via a router and/or base station, to a network, such as the Internet 112. The annotator computing device 104 may optionally include a connection 111, such as a wired or wireless connection, directly to the seller server 106. Via their respective network interfaces, respective network connections 101, 103, 105, and 107 to the network, such as the Internet 112, and/or optionally via the connections 109, 11, and 113, the buyer computing device 102, the seller server 106, the item imaging system 108, and/or the annotator computing device 104 may exchange data with each other.

In an embodiment, an item imaging system may include one or more image capture area or photo booth. For example, an item imaging system may include two image capture areas, such as roundhouse and hot box.

In an embodiment, a roundhouse may comprise a structure, such as a dome structure, including one or more cameras, such as three cameras, one or more lights, such as fifty or more lights, and a vehicle turntable, such as a twenty foot wide vehicle turntable. In an embodiment, the exterior of a vehicle placed on the vehicle turntable may be photographed within the roundhouse by the one or more cameras to generate a plurality of images (i.e., exterior photos) of the vehicle. In an embodiment, the plurality of images (e.g., sixteen images) may be captured in a series of sequences automatically recorded and timed with the firing of the lights of the roundhouse and/or the movement of the vehicle turntable.

In an embodiment, the roundhouse may be a structure with a circular base and conical or spherical ceiling. The roundhouse may be a completely enclosed structure. The walls of the roundhouse may be curved and may be painted a uniform white with a ring of grey at the base of the walls. The floor of the roundhouse may be composed of a mechanical turntable, which may also be painted grey. There may be a gap between the edge of the turntable and the outer wall of the roundhouse. The ring around the perimeter of the turntable formed by the gap between the turntable and the outer wall may be filled with lighting equipment, none of which may be directly visible to the cameras of the roundhouse. With regards to cameras, there may be any number of cameras, such as one, two, three, four, or more cameras. In a specific embodiment, there may be three cameras in the roundhouse. One camera may be positioned directly above the floor of the roundhouse, centered with the turntable to capture the top view of the vehicle. A second camera may be set in the center of the wall and may be configured to record all eye level images. A third camera may be set at an angle higher up on the ceiling between the first camera and the second camera. There may be one break in the lighting ring and smooth surface of the interior wall. This break may be the single enter/exit point for the roundhouse.

Figure 2A:
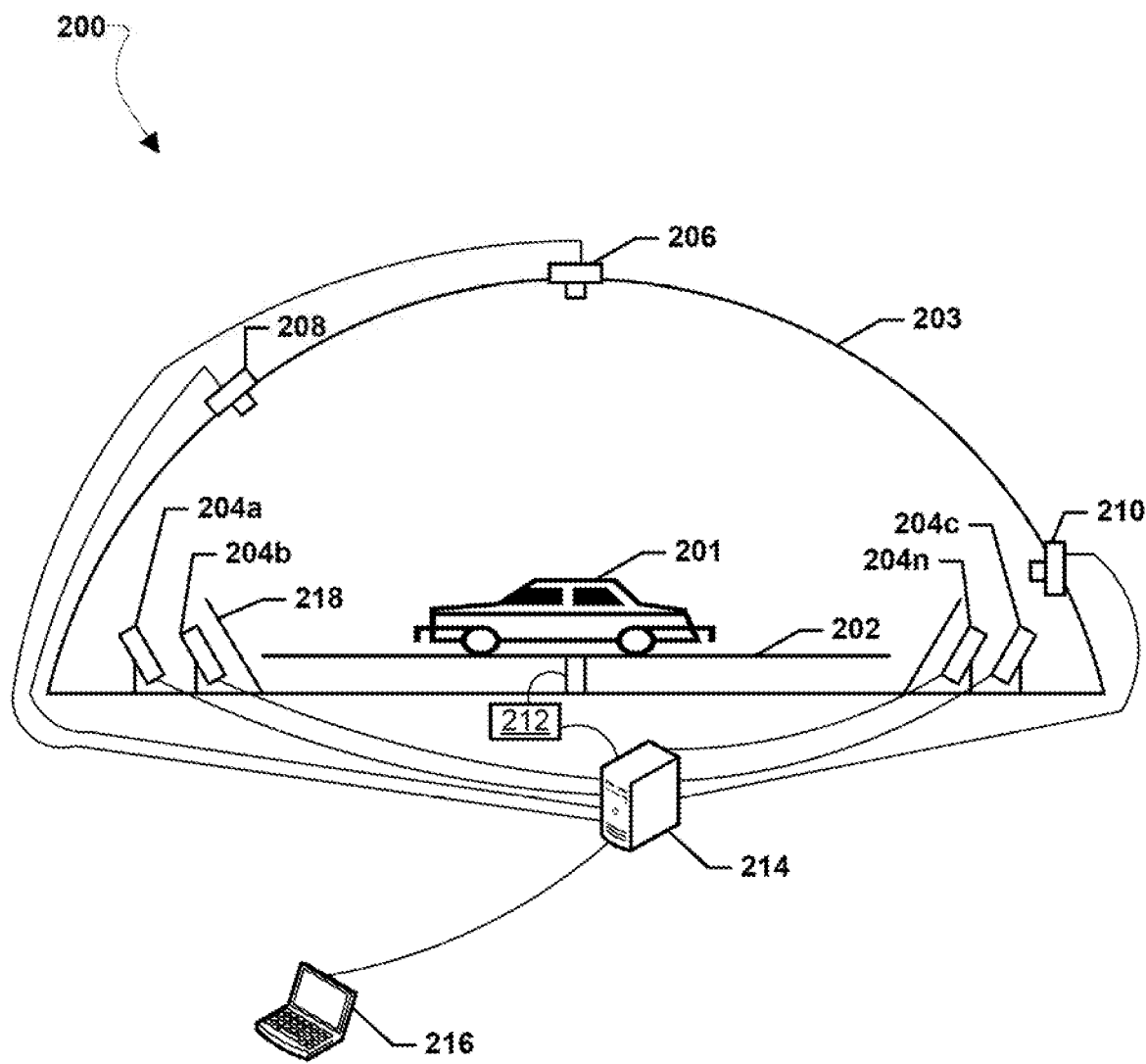
FIGS. 2A and 2B illustrate views of a component block diagram of a roundhouse according to an embodiment.
Figure 2B:
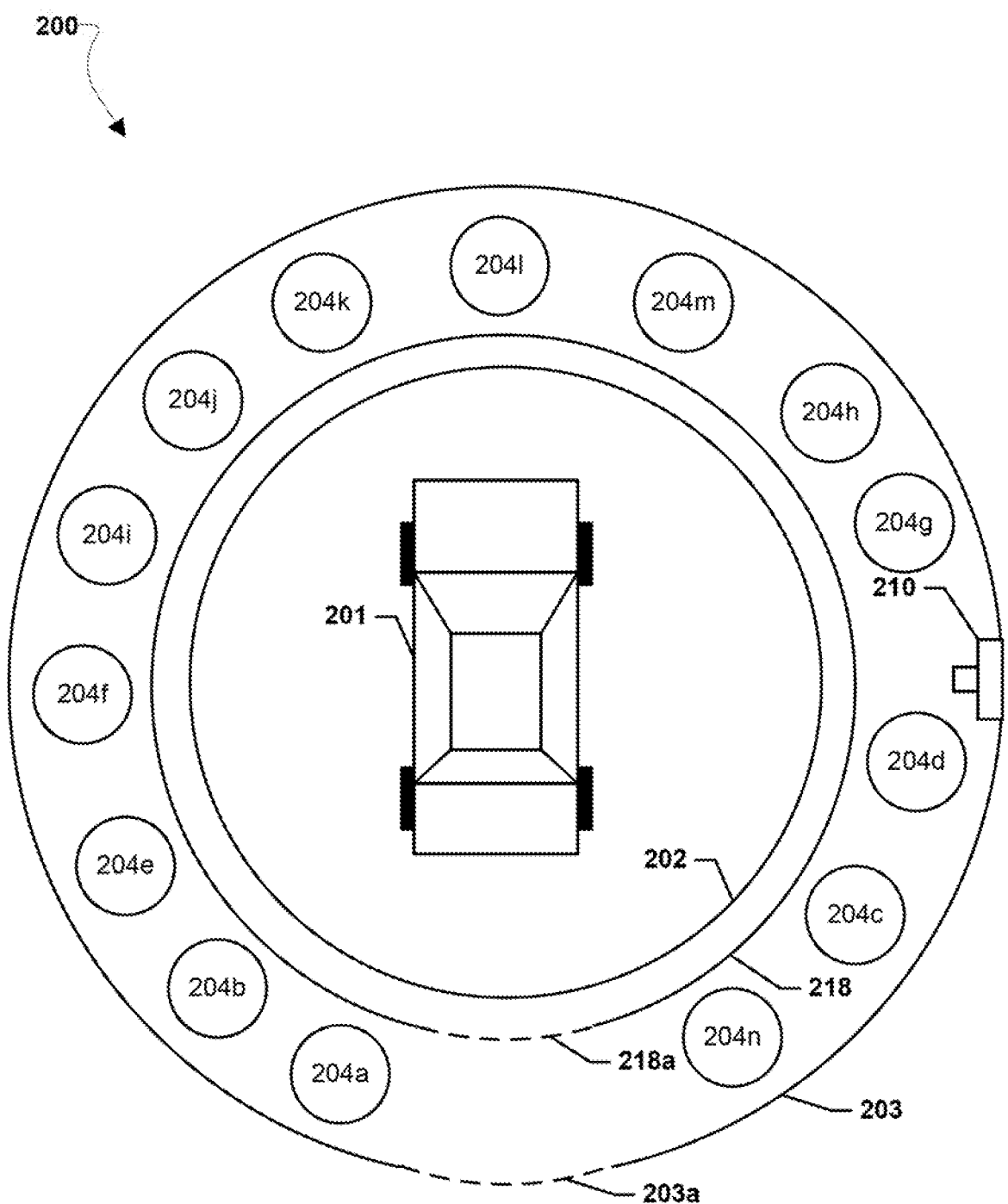

FIGS. 2A and 2B illustrate views of a roundhouse 200 according to an embodiment. FIG. 2A illustrates a side cutaway view of the roundhouse 200, and FIG. 2B illustrates a top down cutaway view of the roundhouse 200. In an embodiment, the roundhouse 200 may include, a dome ceiling 203, a turntable 202, a series of one or more lights 204a . . . n, and one or more cameras, such as three cameras 206, 208, and 210.

In an embodiment, the turntable 202 may be a twenty foot diameter turntable configured to support up to 8,000 pounds. The turntable 202 may be controlled by a controller 212, such as a programmable logic controller (PLC), connected to a roundhouse processor 214, which may be connected to a roundhouse control terminal 216, for example a user interface such as an 8.4 inch color thin film transistor (TFT) touch screen with hand held remote. In an embodiment the roundhouse processor 214 and control terminal 216 may be separate computing devices, or may be the same computing device. While the turntable 202 may be capable of being operated manually via the touch screen interface, the turntable 202 may be configured to rotate automatically, for example in response to commands from a roundhouse processor 214 configured to control the overall operation of the roundhouse 200. Specifically, the turntable 202 may be programmed to rotate once a full 360 degrees clockwise or once 360 degrees counterclockwise followed by a 180 degree further rotation in the same direction. The speed of rotation may be variable to within one revolution per minute (RPM). Physically the turntable 202 may be a circular surface set over a circular track with several wheels mounted on spacers. The turntable 202 may rotate around its main support, the center bearing, and may be powered by a motor operating a drive assembly which uses a large drive wheel to propel the turntable 202. There may be a reducer which may be used to slowly stop the table when one of the above sequences is terminated as a way to mitigate the stress of sudden changes in velocity. The motor, drive assembly, and reducer may be electronically connected to the control panel and/or controller 212. The turntable 202 may be painted in the same grey paint as the base portion of the wall, so that there may be a blending effect on the final photography.

Another key component to the roundhouse 200 may be the lighting design. The roundhouse may include a series of any number of lights 204a-204n. As an example, the roundhouse 200 may include fifty-seven separate lights. In an embodiment, all of the lights 204a-204n of the roundhouse may be Alien Bees model B1600 lights from White Lightning. The roundhouse 200 may also include a series of additional lighting related equipment, such as reflectors (e.g., in light reflectors), flash tubes, lamps (e.g., a 150 watt modeling lamp), etc. In an embodiment, all of the lights 204a-204n in the roundhouse 200 may be located around the perimeter of the turntable 202, hidden by a raised border 218 that may lie between the turntable 202 and the outer wall/ceiling 203. The raised border 218 may be painted grey to match the turntable 202, while the outer wall 203 may be painted white. This raised border 218 may ensure that the lights 204a-204n are not visible on the photographs, because the raised boarder 218 surrounding the lights 204a-204n may blend in with the floor in photographs.

In an embodiment, the series of lights 204a-204n may each be connected to the processor 214, which may be configured to control the power output of any of the series of lights 204a-204n. In an embodiment in which the series of lights 204a-204n may be comprised of fifty-seven lights, each of the fifty seven lights may be assigned to one of five categories. A large portion of the lights, such as forty-six out of the fifty-seven lights, may serve as ring slaves (S) and may be evenly spaced around the perimeter of the roundhouse. The ring slave lights may all point at upward angles ranging from ten to thirty degrees toward the outer wall and away from the turntable. In this way the S group of lights may serve to create a ring of light around the turntable and may be responsible for creating the ambient light which may reflect off the white walls to create an all around soft glow over the subject to be photographed (i.e., the vehicle). In an embodiment, the ring slave (S) lights may be identified by a letter and a number. The letter may correspond to the side of the room that the light may rest at, L for left and R for right. Each light may then be ordered from 1 to 24. Lights L5 and R6 may be excluded from this group as they may serve as the Ring Sync lights (A). Two other lights, LB and RB, may be the Side Accent Lights (B) which rest between L10.5 and L11 and R9 and R10 respectively. These lights may also use the reflectors to increase their range. Two more lights, LC and RC, may serve as the Front Accent Lights (C). LC may be located between L4 and L5 and is 44.75 inches from the outer wall the third greatest distance a light has from the wall. RC may be located between R3 and R4 and is 45.5 inches from the wall. The only other light that may be farther may be RD, which may be the right-side component of the Front/Rear Accent Lights (D) and may be located behind R5. LD, the left side counterpart to RD, may be located between L15 and L16 and may be only 15.75 inches from the wall 203. All of the original 57 lights, regardless of letter group designation or angle of tilt, may be on 38 inch high stands. Additionally, there may be two additional lights, marked as #1 and #2 and are on 43-inch stands, at angles of 40 degrees and 30 degrees respectively. These lights may also be part of the slaves and may be set together off of the ring slightly, opposite the entryways 203a and 218a through the wall 203 and raised border 218, respectively, into the interior of the roundhouse 200, each of which may not have any lights in front of them to enable a vehicle 201 to drive into and out of the roundhouse 200. The lighting configuration may enable any vehicle 201 or other product that may be placed within the roundhouse 200, to be well lit without having to manually adjust the positions, heights, angles, and/or power output of any of the series of lights 204a-204n. In an embodiment, to facilitate the lighting of the vehicle 201 the processor 214 may designate that only certain lights fire for certain alignments of the turntable 202 and cameras 206, 208, and 210. In an embodiment, each category of light: S, A, B, C, and D; may only be fired by the processor 214 with respect to certain cameras 206, 208, and/or 210 that may be taking a picture at a given moment.

In an embodiment, the roundhouse 200 may include any number of cameras, such as three cameras 206, 208, and 210. All three cameras 206, 208, and 210 may be Nikon D800 digital SLR's. Each camera 206, 208, and 210 may use an AF-S Nikkon 24-70 mm f/2.8G ED lens. One camera 206 may be positioned directly above the center of the turntable 206 facing down and may be known both as the Top Down camera and camera #1. Another camera 210 may be positioned parallel to the side wall directly across from the access doors 203a and 218a that may be utilized to allow each vehicle 201 into and out of the roundhouse 200. In an embodiment, there may be a section of the wall cut out to allow the camera 210, which may be housed just behind the wall 203, a view out into the interior room of the roundhouse 200. Known both as the Hero Camera and camera #2, camera 210 may approximate a person's eye level view. The remaining camera 208, which may be referred to as camera #3, may be positioned high on the wall 203 at an angle and may be used to capture images of a vehicle 201 with all of its doors and other hatches open. This camera 208, which may be referred to as the All Open camera as well, may be an ideal compromise between the top down camera 206 and the hero camera 210 when capturing a wider shot of the vehicle 201, motivated in part by the extra volume a vehicle 201 may appear to take up when it has its doors open wide. Each camera 206, 208, and 210 may serve a particular purpose both with regards to the movement of the turntable 200 and to the firing of certain lights of the series of lights 204a-204n. Each camera 206, 208, and 210 may be connected to the processor 214 and may be controlled by the processor 214 to take photographs of the vehicle 201 as the series of lights 204a-204n is fired and the turntable 202 is rotated. Each of the cameras 206, 208, and 210 may send their photographs taken to the processor 214 for storage and/or transmission onto other devices for further processing.

In an embodiment, there may be two procedures that the turntable 200 may be programmed to perform automatically in response to control signals from the processor 214, each using its own combination of cameras 206, 208, and/or 210, which in turn may relate to two different combinations of the series of lights 204a-204n. The different procedures may be called Event A and Event B and may be used for specific and different photographic purposes. Event A may be for capturing the exterior of the vehicle 201 with all doors closed. First, neither event may be activated if the turntable 200 may not first be set at the home position, which may be done from the control terminal 216, such as a touch screen. Once reset at the home position, or zero degrees, the operator may begin Event A by selecting the event on the control terminal 216, such as by selecting a button of the labeled "Event A". In response to the selection of Event A, the processor 214 may prompt cameras 206 and 210 (the top down and hero cameras) to wake up and fire (i.e., take a photograph). When the Top Down camera 206 fires, only lights designated as S or D may be used. Then the Hero camera 210 may record an image of the front of the vehicle, using the A, B, and S lights. Then the turntable 200 may begin to rotate clockwise by a full 360 degrees. The Hero camera 210 may record 15 more images, as the turntable 200 passes 15 specific positions. For example, camera 210 may record images at 22 degrees, 44 degrees, 68 degrees, 90 degrees, 113 degrees, 136 degrees, 158 degrees, 180 degrees, 202 degrees, 224 degrees, 247 degrees, 270 degrees, 293 degrees, 316 degrees, and 338 degrees. The position at 360 degrees may also be the position at 0 degrees, so there may be no need to record an image at 360 degrees. Event A may finish when the vehicle 201/turntable 202 may return to their original positions.

Upon completion of Event A, the operator may walk into the roundhouse 200 and open all of the doors, the hood, and the trunk/hatchback on the vehicle 201 and returns to the control area to initiate Event B. Event B may be initiated by the operator pushing a button, such as a button labeled "Event B" on the control terminal 216. Event B may use the same positions along the table's path to key the cameras to fire, except that the Hero camera 210 may be replaced with the All Open camera 208. This may mean that camera 206 may still fire first, but then camera 208 may fire after camera 206. When this camera 208, the All Open camera, fires, the processor 214 may control lights A, B, S, and C discussed above to be on. The camera 208 may then record an image for each of the next 15 pre-set positions, except the turntable may be moving in a counterclockwise direction. The entire process, with the exception of actually opening the doors and hatches on the vehicle, may be automated and controlled by the processor 214. If for some reason there may be an error or an emergency, the operator may stop the process at any point and may also move the table manually in either direction or may reprogram the positioning for any of the 15 photos using the control terminal 216. Event B may include an additional step of rotating the turntable 202, for example, another 180 degrees, when the turntable 202 finishes so that the vehicle 201 may be facing front side towards the access door to the roundhouse 200, for ease of exit. While discussed in terms of two events and a series of 16 photos in each event, there may be more or less events and more or less photos in each event. For example, the processor 214 may direct additional events and/or photos to be undertaken if adjustments to photos and/or vehicle 201 positioning may be needed.

Figure 3:
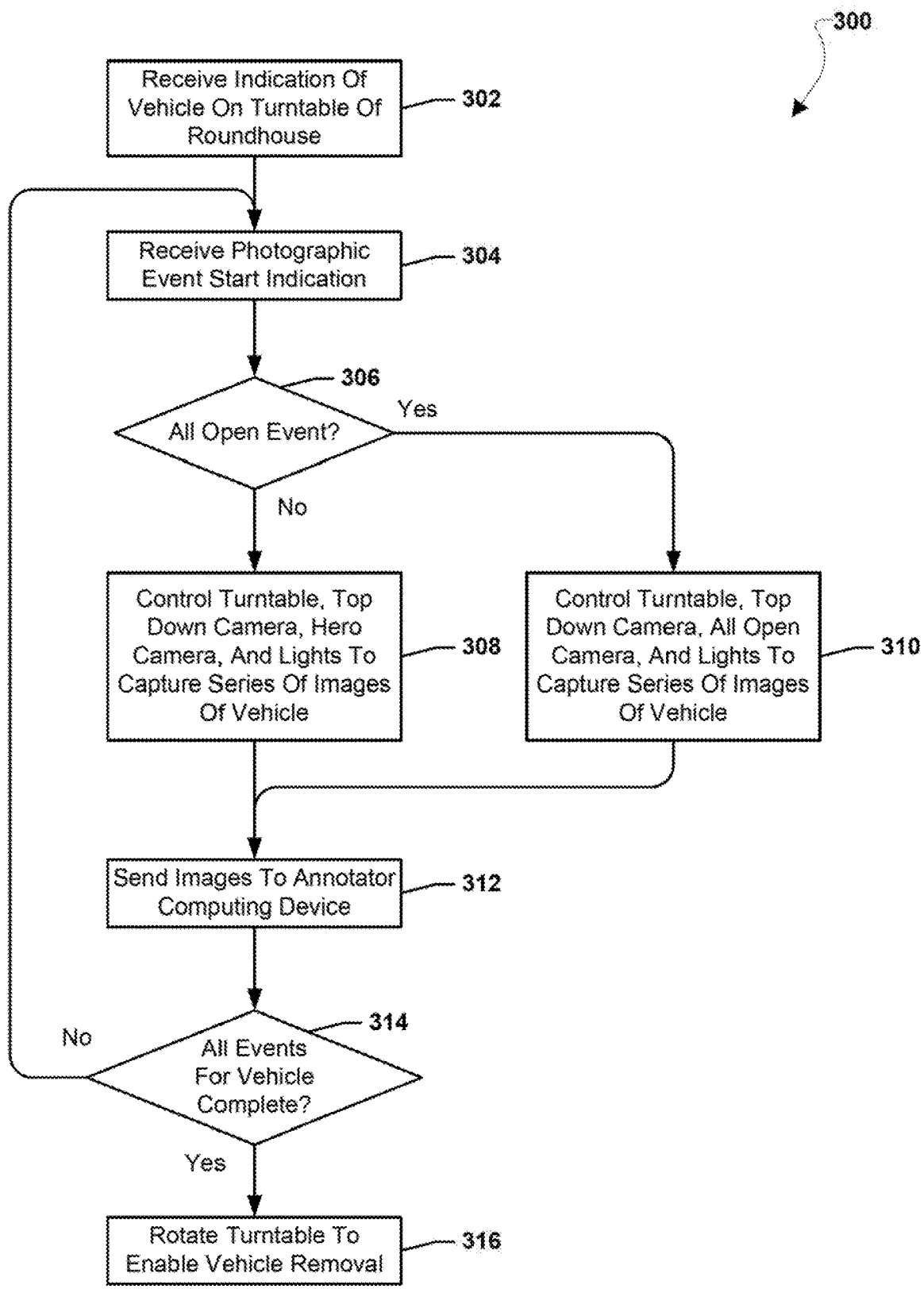
FIG. 3 is a process flow diagram illustrating an embodiment method for controlling a roundhouse to generate images of a vehicle.

FIG. 3 illustrates an embodiment method 300 for controlling the roundhouse to generate images of a vehicle. In an embodiment, the operations of method 300 may be performed by a processor of a roundhouse, such as processor 214 described above with reference to FIGS. 2A and 2B. In block 302 the roundhouse processor may receive an indication of a vehicle on the turntable of the roundhouse. In an embodiment, the indication of the vehicle on the turntable of the roundhouse may be an indication of vehicle information entered into a control terminal of the roundhouse related to a vehicle to be imaged, such as a vehicle identification number (VIN). The indication of a vehicle on a turntable of the roundhouse may be an indication to the roundhouse processor that a new series of images is to be captured. In block 304 the roundhouse processor may receive a photographic event start indication. In an embodiment, a photographic event start indication may be a selection of an event, such as doors closed photographs or doors open photographs, selected by an operator using a control terminal.

In determination block 306 the roundhouse processor may determine whether the received photographic event start indication is associated with an all open event. If the indication is not associated with an all open event (i.e., determination block 306="No"), the vehicle on the turntable may be intended to be photographed with its doors and hatches closed, and the roundhouse processor may control the turntable, top down camera, hero camera, and lights to capture a series of images of the vehicle with the doors and hatches closed. In block 312 the roundhouse processor may send the captured images of the vehicle to an annotator computing device for further processing. In determination block 314 the roundhouse processor may determine whether all events for the vehicle have been completed.

If all events for the vehicle have not been completed (i.e., determination block 314="No"), in block 304 the roundhouse processor may receive another photographic event start indication and in determination block 306 determine whether the event is an all open event. If the event is an all open event (i.e., determination block 306="Yes"), in block 310 the roundhouse processor may control the turntable, top down camera, all open camera, and lights to capture a series of images of the vehicle with its doors and hatches open. In block 312 the roundhouse processor may send the captured images to the annotator computing device, and in determination block 314 the roundhouse processor may determine whether all event for the vehicle are completed. If all events are completed (i.e., determination block 314="Yes"), in block 316 the roundhouse processor may rotate the turntable to enable vehicle removal, for example by rotating the turntable to point the front of the vehicle towards an opening in the roundhouse so the vehicle may be driven out of the roundhouse.

In an embodiment, the roundhouse processor 214 described above with reference to FIGS. 2A, 2B, and 3, may be one or more processors working in tandem, such as three personal computers, one for each camera, that may all linked to a central processor, such as a central Macintosh computer, which may also operates a dual partitioned hard drive. Each of the three Nikon camera's 206, 208, and 210 may be connected to a Toshiba Satellite R845585 Laptop via 3.0 Gigabyte Ethernet cables. These personal computers (PCs) may be needed to activate each camera 206, 208, and 210 when it is needed, based on the position of the turntable 200. Each computer may then send the recorded image to the virtual desktop stored within the divided hard drive on the central processor, such as the Macintosh computer. This configuration may be necessary so that the various software packages operate well together on common operating systems as well as to connect to external servers and/or computing devices, such as the annotator computing device, where a copy of each image(s) may be stored. In an embodiment, a copy of the image may be displayed to the operator of the roundhouse, for example on the control terminal 216, which may be an Macintosh computer capable of photo editing via a photo editing applications, such as Photoshop. In a specific example, the roundhouse processor 214 may be a mid 2010 model Mac Pro with a 2×2.66 GHz computer with a 6 Core Intel Xeon processor, 48 GBs of memory with 1333 MHz DDR3 ECC and may uses a ATI Radeon HD graphics processor. That machine may be connected to two 27 inch Apple LED Cinema Display computer monitors so that the roundhouse operator (or other photo technician) may examine and correct any errors on the photographs taken by the cameras 206, 208, and/or 210. If an issue is too severe to fix digitally, such as with a slight lighting discoloration, then new images may be taken. When the technician approves the images, the images may be sent to an external system, such as the annotator computing device for use in an Exterior Spinner and/or Visual Annotation Application.

In an embodiment, fully simulating a digital, three-dimensional model of a real vehicle on a two-dimensional plane may comprise detailing the interior space as well as the exterior of the vehicle. Similar to the processes described above, the process to creating a virtual interior for a real vehicle may begin with photographing the actual interior of the vehicle. In an embodiment, photographing the interior of the vehicle may be accomplished using a photographic imaging system (e.g., an image capture area or photo booth) referred to as a hot box. In an embodiment, a hot box may be a structure that includes a vehicle lift and a panoramic camera mounted on a robotic arm. A hot box may be used to capture interior photos of a vehicle by extending the camera with the robotic arm in through a window of the vehicle to record a full panorama of the interior. That image may then be sent/scanned into a remote computing device, such as an annotator computing device, for storage and photographic adjustments. Then the image may be utilized in both a Visual Annotation Application as well as an Interior Spinner application.

Figure 4A:
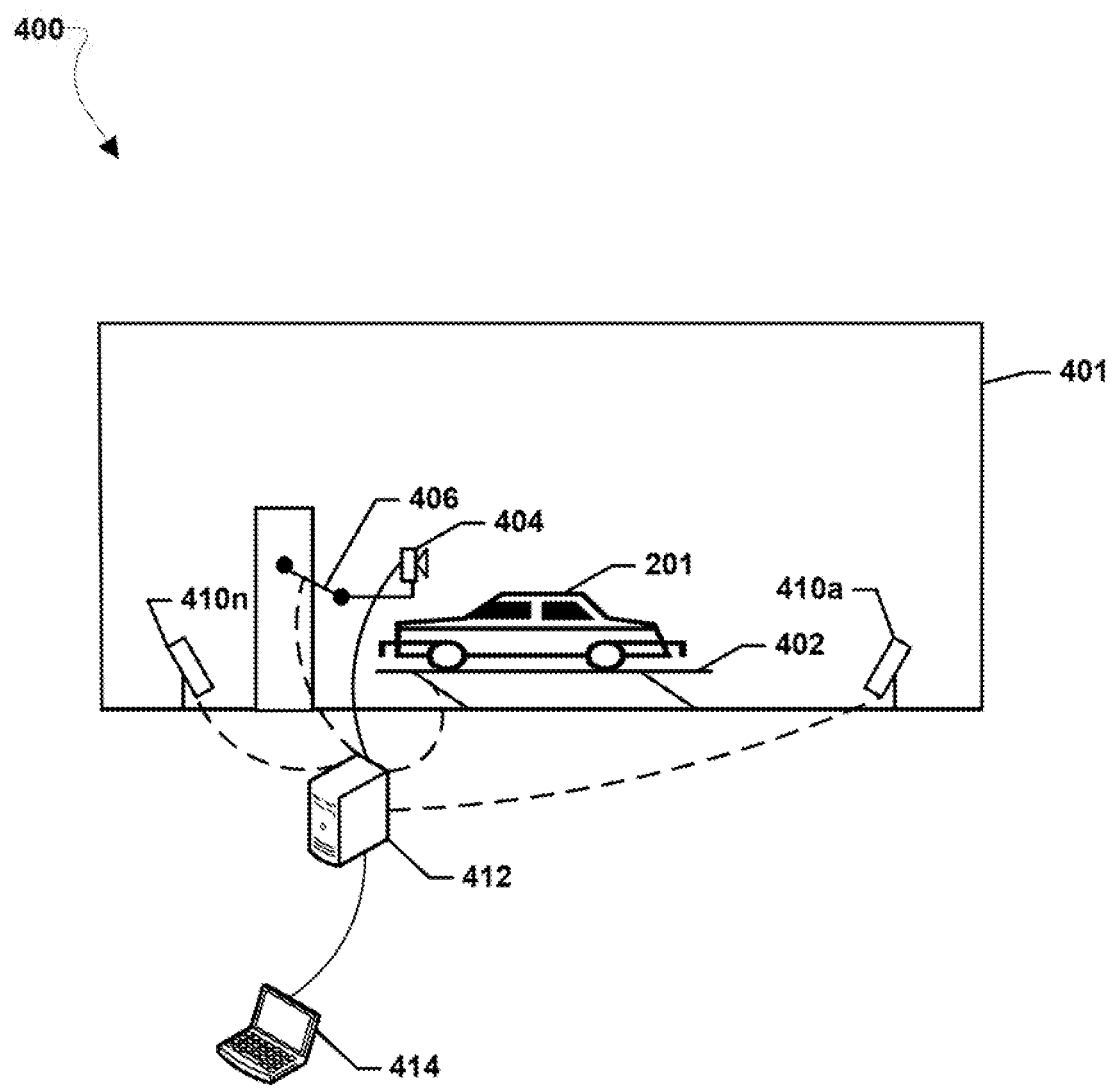
FIGS. 4A and 4B illustrate views of a component block diagram of a hot box according to an embodiment.
Figure 4B:
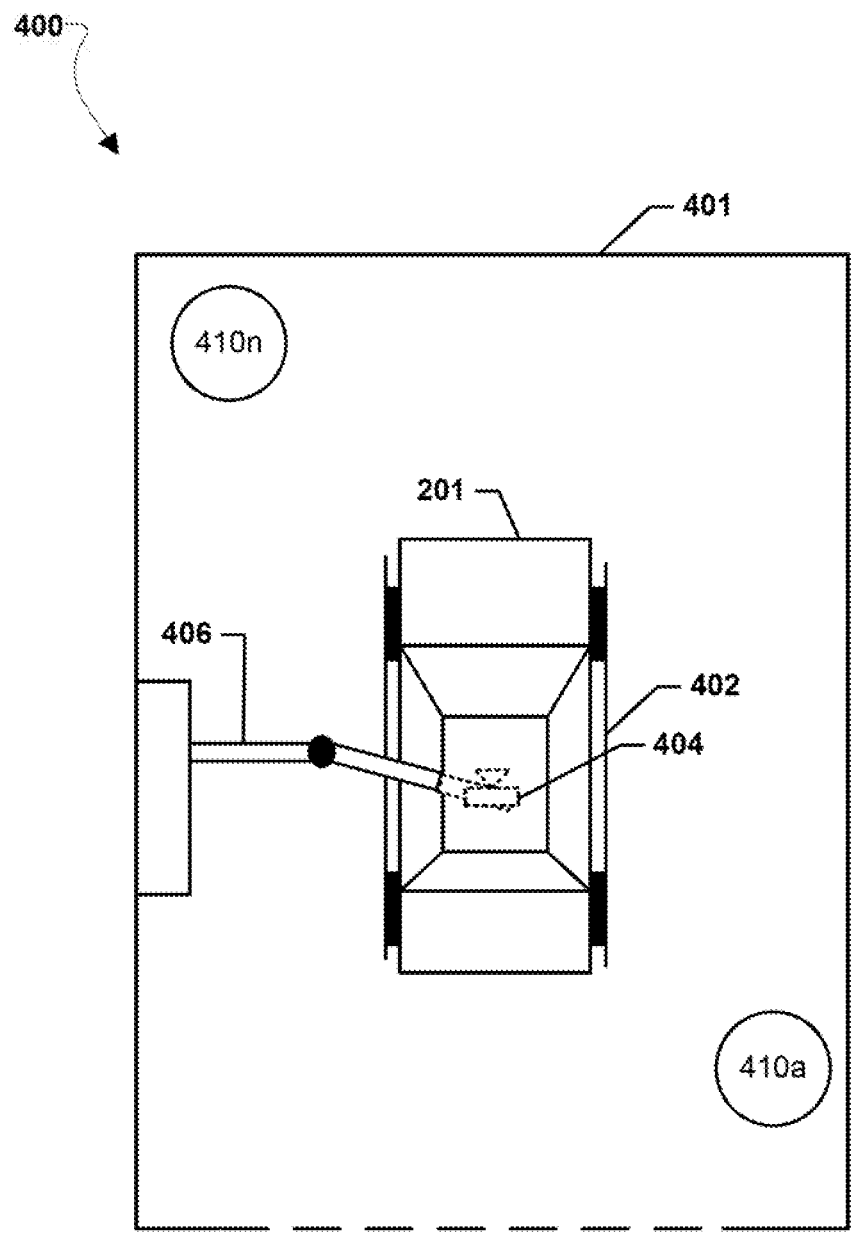

FIGS. 4A and 4B illustrate views of a hot box 400 according to an embodiment. FIG. 4A illustrates a side cutaway view of the hot box 400, and FIG. 4B illustrates a top down cutaway view of the hot box 400 with the arm 406 and camera 404 extended into the vehicle 201. In an embodiment, the hot box 400 may include a structure 401 comprised of walls and a ceiling, a lift 402, a series of one or more lights 410a . . . n, an arm 406, and one or more cameras, such as a panoramic camera 404 mounted on the arm 406.

One issue with automating the photographic process with the interior photo capture booth, or hot box 400, may be accounting for the differences in vehicle 201 height. To solve this issue a rotary lift 402 may be installed at the base of the hot box 400. In this manner, the camera 404 and robotic apparatus, such as the arm 406, supporting the camera 404 may be set at one height, while the vehicle 401 may be moved into position vertically with the lift 402. As an example, the particular lift 402 used by may be a model Y12, serviced by VSE of Georgia. The lift 402 may raise two sides of a vehicle 201 in parallel via an equalization hydraulic system. The lift 402 may include built in locks placed at certain heights as a safety feature that lift 402 may be lowered to at any point. The camera 402 of the hot box 400 may be connected to a hot box processor 412 which may be connected to a control terminal 414. Optionally, the series of lights 410a . . . n, arm 406, and lift 402 may be connected to the processor 412, but alternatively, the series of lights 410a . . . n, arm 406, and lift 402 may not be automatically controlled by the processor 412. In an embodiment, the processor 412 and the control terminal 414 may be separate devices or the same computing device. As an example, the processor may be a mid-2011 iMac computer built into a 27-inch display including a 3.4 GHz processor, Intel i7 Core with 8 GB of memory at 1333 MHz DDR3 with an AMD Radeon HD graphics card. The processor 412 and/or control terminal 414 may be used for digital photo correction before the image may be sent to both the annotator computing device and any other external systems. In an embodiment, each vehicle 201 may be lined up manually and raised to the required height manually using the light 402. In an embodiment, a "daylight" effect within the interior of the hot box structure 401 may be created the artificial lighting available to the hot box 400 provided by the series of lights 410a . . . n.

The series of lights 410a . . . n may be any number for lights. For example, the hot box may include 24 Nossan Nos-1200 DTD HMI lights with 1200 Watts of power available per light. Hydrargyrum Medium-Arc Iodide (HMI) lights may be commonly used in film and television production and may operate by generating an electrical arc between two electrodes within the bulb that excites pressurized mercury vapor. HMI lights may be brighter and more efficient more traditional lighting technologies, such as the incandescent bulb. In a similar practice to that employed in the roundhouse described above, the series of lights 410a . . . n may be positioned in a way so that the series of lights 410a . . . n shine indirectly on the vehicle 201, reflecting off of white painted walls of the structure 401 to create a more natural, diffused lighting effect. The exact lighting levels may be adjusted to meet the needs of individual vehicles and there may be very little physical adjustment that needs to be made to optimize the lighting to capture an interior photograph. The hot box 400 may reduce processing time considerably, from a matter of hours to minutes.

The hot box 400 may include one or more cameras, such as a panoramic camera 404. For example, the camera 404 may be a Panoscan Mark 3 camera that may be used to record a full panoramic image of the interior of the vehicle. In order to assist the camera 404 in recording within the tight confines of vehicle interiors, the camera 404 may use an attached fisheye lens to help expand its visual range. The Panoscan output may be in the form of a Mercator projection. Normally Mercator projects may be a method of transferring a spherical or elliptical image onto a flat surface. The full 360 degree photo may be laid flat via the Mercator projection when stored on one of remote desktops, but it may also be stored such that the image may be re-interpreted as a three dimensional image later on by another system. The control arm 404 may be coupled to the camera 404 and may be controlled by the processor 412 and/or manually operated via a remote by the hot box operator. In an embodiment, unlike the roundhouse described above, the hot box operator may personally align the camera 404 within each vehicle 201, after leveling the vehicle 201 with the lift 402 first.

Figure 5:
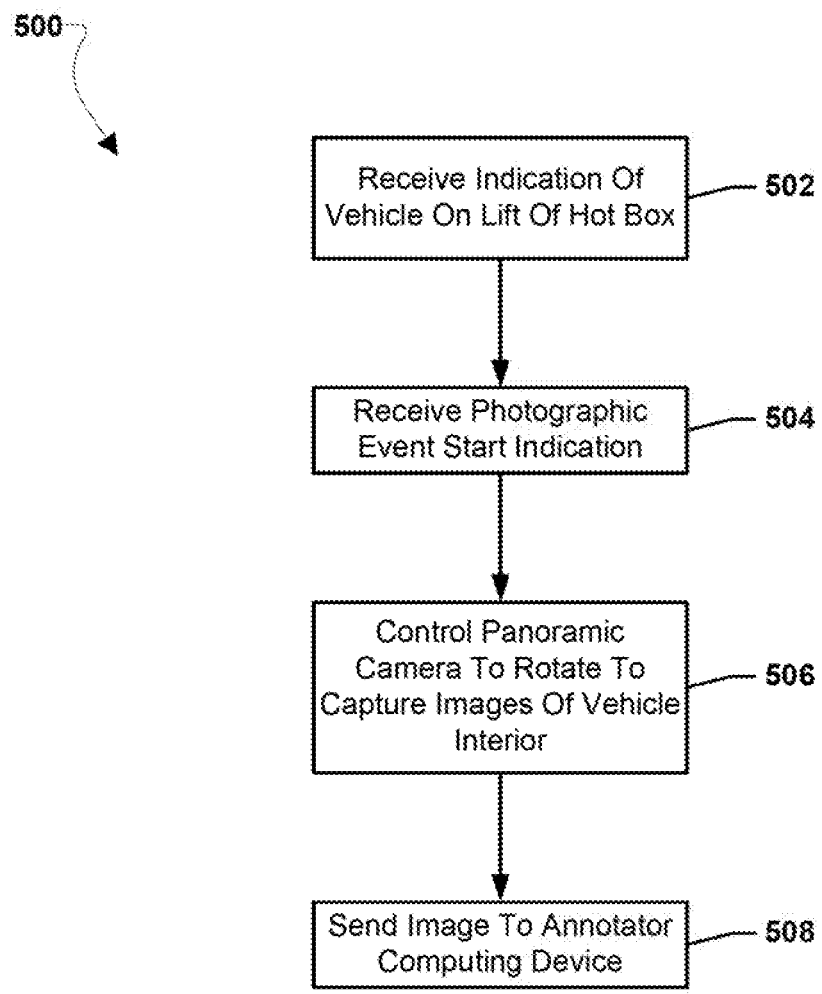
FIG. 5 is a process flow diagram illustrating an embodiment method for capturing interior images of a vehicle.

FIG. 5 illustrates an embodiment method 500 for capturing interior images of a vehicle. In an embodiment, the operations of method 500 may be performed by the processor of a hot box, such as hot box processor 412 described above with reference to FIGS. 4A and 4B. In block 502 the hot box processor may receive an indication of a vehicle present on a light of the hot box. In an embodiment, the indication of the vehicle on the lift of the hot box may be an indication of vehicle information entered into a control terminal of the hot box related to a vehicle to be imaged, such as a VIN. The indication of a vehicle on a lift of the hot box may be an indication to the hot box processor that a new series of images is to be captured.

In block 504 the hot box processor may receive a photographic event start indication. In an embodiment, a photographic event start indication may be an indication of a start button press event by an operator of the hot box from a control terminal of the hot box. In block 506 the hot box processor may control the panoramic camera to rotate to capture images of the vehicle interior. In an embodiment, the panoramic camera may be operated to rotate within the vehicle interior to generate a 360-degree panoramic image of the interior of the vehicle. In block 508 the hot box processor may send the image generated by the camera to an annotator computing device for further processing.

In an aspect, once the roundhouse and hot box have performed a photo capture process, the recorded photographs may be saved, examined, and eventually sent to the next set of systems, such as a seller server and/or annotator computing device described above, that may make up the overall network to generate a virtual display of the vehicle.

In an embodiment, the images captured by the roundhouse and/or hot box described above may be used to generate virtual displays of the vehicle on a website hosted by a seller server. Custom animations may be created for when the customer decides to transition from exterior-angle-doors-closed to exterior-angle-doors-open, or from exterior to interior shots. The photographic recording process using the roundhouse and/or hot box may only be the first step in producing the fully realized virtual vehicles which appear on the website.

Every vehicle may have its own history and its own features, information that is not necessarily clear from a set of photographs. That information may need to be passed on to the customer. Traditional brick and mortar dealers may use window stickers to list most facts about a particular vehicle. In an embodiment, a website hosted by a seller server may have its own digital version of a window sticker in the form of the details page on the website, which may convey all of the necessary information to a customer. However, additional relevant details about the vehicle may be provided in a virtual display, such as the Spinner feature described below. These features on the Spinner may be known as annotations. The annotation system may allow vehicle information, specifications, and imperfections to be displayed on the digital model. To do this annotations have to be assigned specific locations on the vehicle for use on the website. These points for annotations, known as hot spots, may have to be manually entered, for example using an annotator computing device. Part of the system is the concept and function of the annotations themselves, information placed within the received photographs. Annotations may be assigned on top of each image through an automated process, before the final product image/model may sent to the seller server for use in the seller's website.

Annotation information may be developed on the vehicle storage site. Before a vehicle may be sent to the roundhouse and the hot box for photo capturing, two separate inspections may be performed by experienced technicians. The first inspection may look for any mechanical damage while the second one may be purely focused on recording cosmetic issues. Information gained from the inspections may be compiled into an information packet with diagrams and notes that may be paired with the photographs of the vehicle by the common identification stock number or VIN number. However the information as it is recorded in the packet may not be ready to be immediately translated into the virtual world as hot spot annotations. When a new vehicle is recorded and needs to be annotated it may be the job of a certain individual, an annotator, to translate the information recorded from both inspections in one document into multiple annotations, each one requiring placement on or within the virtual display of the vehicle generated from the images captured in the roundhouse and/or hot box.

Annotation via hot spots may allow the customer to view and learn about points of interest on the vehicle from the digital representation of the actual vehicle as opposed to just reading about the vehicle. However, new hot spots, without aid, may have to be manually placed onto every two-dimensional image of the vehicle so together the hot spots appear as one consistent point in the final model. Every annotation that is made may be given a hot spot, which may be assigned a coordinate location on a Cartesian two dimensional plane, as well as an Angle measure. The Angle measure may relate to the angle of the vehicle to the camera, or in other words the particular frame where the annotation may be visible. If the annotation is visible from multiple angles, then for each frame a hot spot may be assigned a specific position along the horizontal and vertical axis of the image in units of image pixels. For exterior annotations which may be highly visible, it may become a tedious and inefficient practice to record several different hot spots on several different angles, all to relate back to one annotation.

Therefore, in an embodiment, a visually based application may be employed which, aided by an interactive system or tool, automatically populates a location for every angle the annotation may be visible in, all based on one single input, allowing for each annotation to be added to the vehicle quickly and accurately.

In an embodiment, the annotations may be entered into the virtual display (or model) of the vehicle by an annotator operating an annotator computing device running a visual annotation application. The annotator computing device may receive the images generated by the roundhouse and/or hot box as well as data files associated with any inspections of the vehicle. The Visual Annotation Application may facilitate the creation of annotations, with automated placement from a single input, and may transfer that data to the digital model of the vehicle. The entire process may begin with the information that may compose each annotation. The two inspections performed on the vehicle by experienced personnel, may be the main source of that information. The inspectors may use diagrams and make notes to record vehicle features such as information about the drivetrain, the engine, and the transmission; as well as any mechanical or surface level damages. All of this data may be inputted onto digital templates which may then be separated by category and location on the vehicle to create information textboxes that describe one individual feature, set of related features, and/or an imperfection. Each hot spot may be composed of an informational textbox that may then be given a physical location on the vehicle. A textbox may simply be a space to hold textual information. It may be left to the judgment of the annotator as to what information must be manually transferred from the template to any number of necessary text boxes. The types of annotations may be separated by the appearance and color of their hot spot icons which may mark its position on the model. Features, such as vehicle warranty, wheel material, or physical dimensions may be given a certain color code and icon, while imperfections may be given another color and icon. Imperfections may be explained via a standardized scale which informs about the severity of the damage on the vehicle. Features may on the other hand be explained in more granular detail. Those differences may be a result of the business practice, however, and not from the design of the system. Regardless of the type of annotation, once a textbox has been created, it may be ready to be assigned a location on the final model.

The mechanics of the virtual display of the vehicle may require that every hot spot may be composed of a coordinate location and an angle measurement. If an annotation requires having a hot spot across multiple angles, it may in fact have several unique hot spots, such as one per angle. The Visualization Annotation Application may fill in all of those separate hot spots for the system based on one location input, mostly because it may use a similar flash application as the one which drives the Spinner, and may therefore be able to communicate with the Spinner easily. Essentially the substitute spinner on the Visualization Annotation Application may be able to reverse engineer frame-by-frame hot spot locations from the single placement on the simulated virtual model of the vehicle. Because of the commonalities between the annotation system and the Spinner, when the images are transferred to the commercial website with the associated textboxes, each annotation may appear to have one hot spot, reconstructed in the proper location on the illusion the Spinner creates of a three-dimensional vehicle. Placing hot spots in the system may require an additional user interface which operates in conjunction with the virtual model to allow the annotator to easily place location icons.

One interpretation of this user interface may be of a targeting icon or reticle which may overlay the flash driven digital model. An additional advantage of the Visual Annotation Application may be that the annotator may have immediate feedback on his or her accuracy, since the input process is a visual one, with the reticle over the simulated model, and not just a text-based process of assigning coordinates. In the final version of the digital model, the customer may access a certain annotation by selecting the hot spot icon on the vehicle, which may bring up the text box created previously right beside the icon. In the Interactive Tour, hot spot placement may be a defining organizational feature. Additionally, the system controls the frame and viewing magnification for the customer when selecting a hot spot on the public version of the virtual vehicle.

An additional consideration beyond just placing the location of an annotation on the vehicle may be determining how the customer views said annotation. When a hot spot is selected on the Spinner or in the Interactive Tour, the viewing window for the customer may be adjusted to give the best vantage point to see the feature. The vertical angle at which the customer views the vehicle may be determined by the physical placement of the cameras when the frames were recorded. However the annotator may decide, based on how he or she may be viewing the vehicle with the system, which of the 34 or more frames/horizontal angles that may be collected per vehicle to use as well as the magnification level. Again this selection process may be done almost automatically, represented by tools on the user interface. For example, the reticle may be surrounded by one or more squares. Each of the many squares, which expand in size around a common center, may represent the portion of the frame that the customer may see when viewing the hot spot. When the annotator selects the desired square, he or she may in fact be selecting the frame and magnification level in which to view the hot spot. Additionally, while the magnification boxes or squares may all by default be centered on the target icon, the boxes or squares may be moved around the target reticle. Thus, the annotator may decide on what portion of the magnified image the actual hot spot icon rests. It may be in the center, off center, or even in a far corner. It may just have to be within the box. This may be especially advantageous if the specific feature or imperfection the hot spot may be highlighting may be particularly large, to a point where the default magnification and centering process would only reveal a portion of the whole annotation to the customer. Once clicked on, the icon itself may disappear so it does not obstruct the view of the specified feature or imperfection. Once the annotation may be assigned a locational hot spot on the vehicle and given an appropriate viewing size, the process may be largely complete. Once annotated, the annotator computing device may send the annotations and/or annotated virtual display of the vehicle to the seller server, for example for use in a Spinner system associated with the seller's website. Since the actual annotation locations may be placed using a very similar application of the Spinner system, there may be no significant issue in pushing the information created in this complimentary system over to the Spinner system in order to be used in it as well as the Interactive Tour system.

Figure 6:
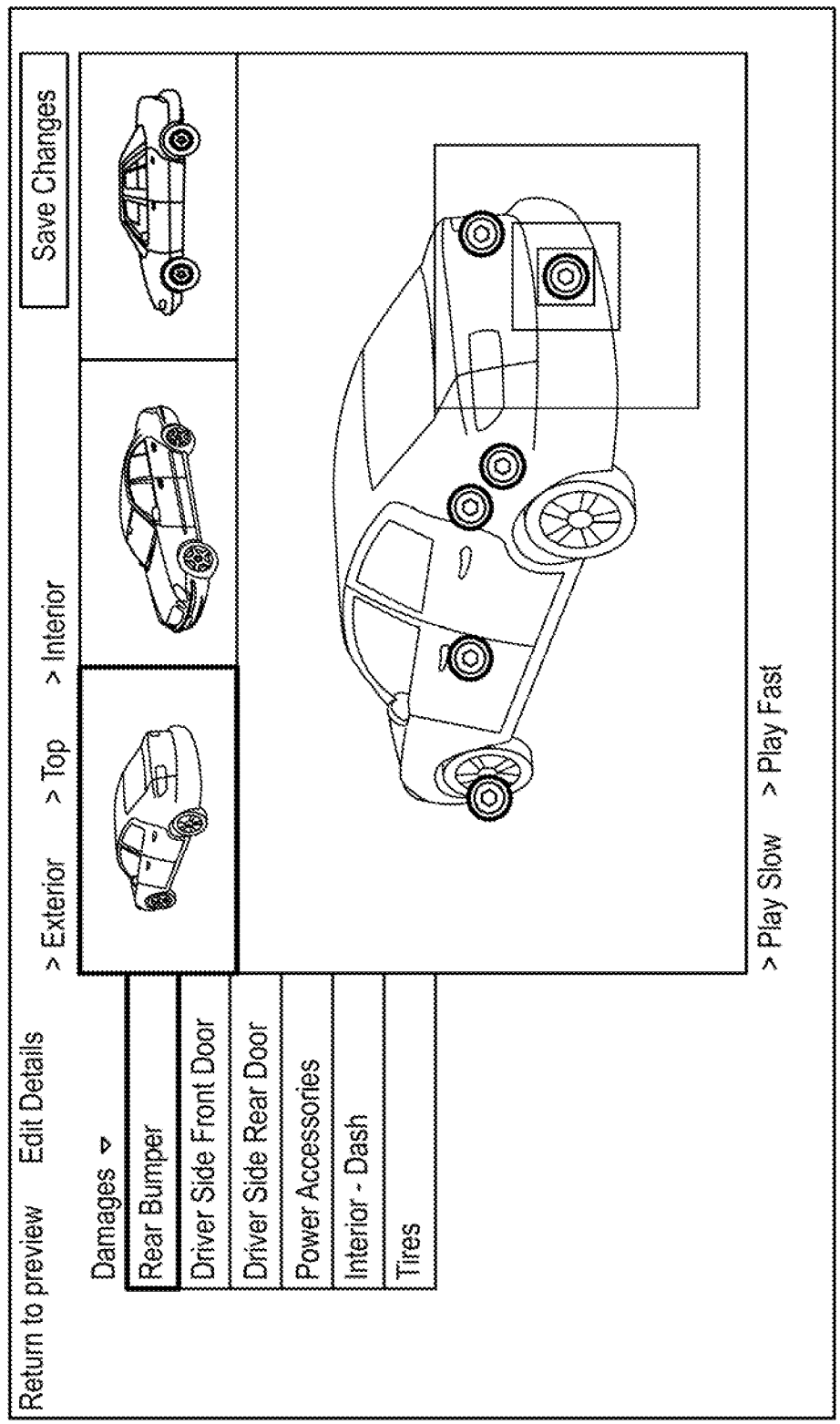
FIG. 6 is an example screen shot of an annotator's interface according to an embodiment.

FIG. 6 illustrates an example Annotator's Interface-Exterior. This may be what the annotator sees when using the Visual Annotation Application. Each individual photo taken of the vehicle may be displayed in a menu above the flash application running modified version of the spinner. To the left of the spinner window, there may be a list of the annotations for the vehicle. That list may be created on a separate page where the annotator creates new text boxes, each one with title and body text. The annotator may select an annotation from that list and then place its corresponding hot spot icon on the vehicle using the Spinner system. Placement may be done using a unique user interface feature. This may be visible on the lower right corner of the Spinner display. The green target icon may be the tool the annotator uses to accurately place a hot spot icon. There may be three boxes surrounding the target or reticle icon. Two of the boxes may be grey, while one may be green. When the annotator places a hot spot via a mouse click, the box that is highlighted green may represent the border of what will be visible for the customer when viewing the hot spot on the final product.

Figure 7:
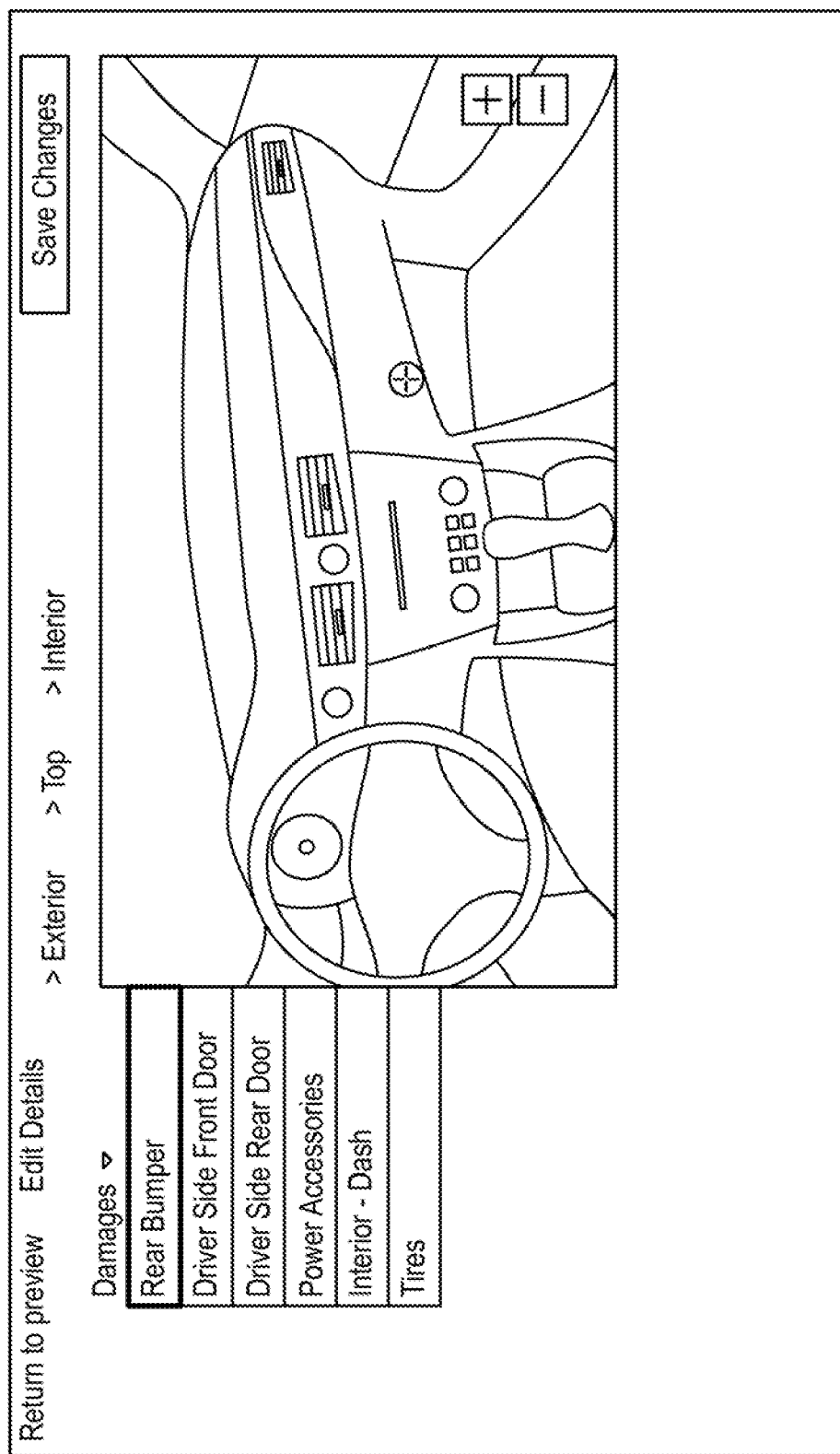
FIG. 7 is another example screen shot of an annotator's interface according to an embodiment.

FIG. 7 illustrates an Annotator's Interface-Interior. Just as the Interior Spinner may be a separate system from the Exterior Spinner on the public website, the annotator may use a separate system within the Visual Annotation Application to mark the interior. Again the annotator may select from a list of annotations made on the left, but as there may only be one interior image, there may be no image menu above the flash window. In terms of the actual user interface for the annotator, there may be no magnification boxes to choose from. The placement icon or reticle may stay centered on the screen for the interior, whereas the exterior reticle may be movable by the user's mouse or similar device. Thus for the interior annotation process, the annotator may move the whole image around with the mouse, lining up the reticle which may be centered in the viewing window on the particular feature or imperfection.

In an aspect, an interactive tour may provide one or more images of a vehicle from multiple exterior and interior angles and map to a digital space to create a simulated 3-D representation of the actual vehicle in a digital environment that may be interacted with by a website user.

In an embodiment, exterior images of a vehicle may compose tiles, many more than 16 for different angles and levels of magnification. The exterior model may be spherical in shape with tiles placed over it. Software may track which tiles may be needed at any time based on the angle and magnification the customer is using. Only the tiles that may be needed may be loaded at any one time, improving speed of operation. In an embodiment, the interior image may be measured for reference points, and then the flat image may be mapped into the interior of a sphere to create the 3-D space for the interior. In an embodiment, the tile space closer to the horizon line may be shaped more like a square, while the tiles towards the bottom of the image may be more distorted in shape, with the lower edge shorter in length with respect to the upper edge. All tiles may be the same size in pixels, but may be manipulated when they are converted into measures of degrees in order to create the illusion that the customer is looking at the inside surface of a sphere, which may be the best way to create the illusion of sitting in the inside of a vehicle for interior virtual displays.

In an embodiment, the annotated images of the vehicle may be used to generate an Interactive Tour feature of a virtual display (or model) of the vehicle. The Interactive Tour may allow a customer to take a tour or close inspection of a vehicle entirely on the seller's website or similar digital portal. In an embodiment, the systems and methods may use information from the Spinner in conjunction with the annotated hot spots created with the Visual Annotation Application. Essentially the Interactive Tour may allow a customer to view each annotated hot spot on the three-dimensional, digital vehicle model as well as move between hot spots. This may be done by simply replacing one hot spot with the other, but that makes no use of the advantages offered by the Spinner. Instead the Interactive Tour may comprise a method and system for generating realistic transitions from one annotation to another without a visible interruption to the virtual reality created by the Spinner. Therefore, instead of simply jumping from one hot spot to another, the systems and methods of the various embodiments may actually produce a smooth and controlled movement across multiple image frames while also adjusting magnification levels so there may be no sudden change in what the customer may see. Natural movement may be simulated, as if the customer where physically walking from one point on the vehicle to another.

In an embodiment, one form of movement may comprise animating such that the transition from one hot spot to the next do not require any rotation of the digital model. In such a case the change in frames or the individual photographs taken of the vehicle may be small. However, there may still be significant magnification changes between the hot spots. Since it would be very disconcerting to the customer if the transition was performed at high magnification in an embodiment, the magnification may be reduced or "zoomed out," to a point where most of the vehicle may be visible in the spinner window on the website. This implies magnification may not have to drop off, but may approach only a fractional increase to 1× magnification. Therefore, as the virtual camera may move across pans over the vehicle, the animation system may be dictating the speed and magnitude of the magnification changes.

The control system for the adjustment in magnification may be derived from the mathematics of Bezier curves. A Bezier curve may be created from a time-varying linear combination of control points, which may be used to define the range for the linear combination of certain Bernstein polynomials that define the curve. The basic equation may be:

$$\sum_{i=o}^{n} \binom{n}{i}(1-t)^{n-i}(t^i * P_i)$$

where n is the total number of control points P, with time t. In this specific case, a control point may correspond to a particular magnification level at a certain time. The physical distance left or right from the starting control point may be a factor of time and may therefore be represented in this equation as well.

Control points for the Bezier curves in this disclosure may correspond to certain points in time and magnification. The initial "zoom" level Z1 may be the magnification used at the initial hot spot. This may also corresponds to Z0. The second hot spot may be the end point in the animation process. The magnification level there may be Z4. In between those two points any number of additional control points may be specified. The minimum necessary may be four control points, or two other time-magnification coordinates. This may be to ensure reduction in magnification far enough that the transition is not confusing. For this situation, the Bezier equation may look like:

$$Z=(1-t)*(Z1+(t*(Z2-Z1)))+t*(Z3+(t*(Z4-Z3)))$$

where: t=time, 0 . . . 1; Z1=start zoom; Z4=end zoom; Z2=Z1−1 (if Z2<1, then Z2=1); and Z3=Z4−1 (if Z3<1, then Z3=1).

As time increases, the zoom level may change. The system may be designed so that the next control point may have a zoom level Z1 which may be equal to Z1 minus one level of magnification. Thus if Z1 is ×3 magnification, then Z2 is x3−x1=x2. Then at the time measurement (t3) corresponding to the third control point the zoom level Z3, which may be equal to Z4-1. The process may end at Z4 and its corresponding point in time. These may be the control points set at four specific points in time and magnification. These control points may then produce a curve which may dictate the dynamic rate of change in magnification for time. To the extent that the system knows it needs to be at the second hot spot in a certain period of time, the above curve may also dictate the horizontal motion on the Spinner. The movement from Z2 to Z3 may happen more quickly than the movement between Z1 to Z2 or the movement from Z3 to Z4. To apply this from a mathematical perspective, time as it is used in the Bezier equation may be treated as a non-linear entity. It may be easier to assign regular time intervals to each Z value and then transform time than to try and assign appropriately uneven time intervals. There may be several transformations that may be done to data that will accomplish this task. Of course in reality time will be moving at a constant rate, but the process may be operating in non-linear time, which may cause some steps in the process to appear to occur more quickly than other steps in the process. This may be done again to approximate human movement in an artificial environment. When all of this may be put together, the system may have an animation program to move from one hot spot to another within one frame of the Exterior Spinner. However, there are other animations that may be performed.

When the movement from one hot spot to another requires moving the model by multiple frames, or changing entire perspectives, then Bezier curves may or may not be employed and if they are then in certain, specific ways. One consideration may be where the next hot spot lies with regard to the initial hot spot. If the simulated three-dimensional model has to be rotated, meaning that multiple frames have to be crossed to facilitate the change in the horizontal viewing angle, then a different animation may be performed. If the next hot spot lies in the interior of the vehicle, then a different animation system may be used. If the next hot spot is still in the exterior, but is a part of the exterior model with all doors open then there may be an animation system for that. Finally, if the next hot spot is on the top-down view of the vehicle, there may be an animation system for that as well. Meanwhile there may be a host of potential changes in magnification that may occur as well.

Figure 8:
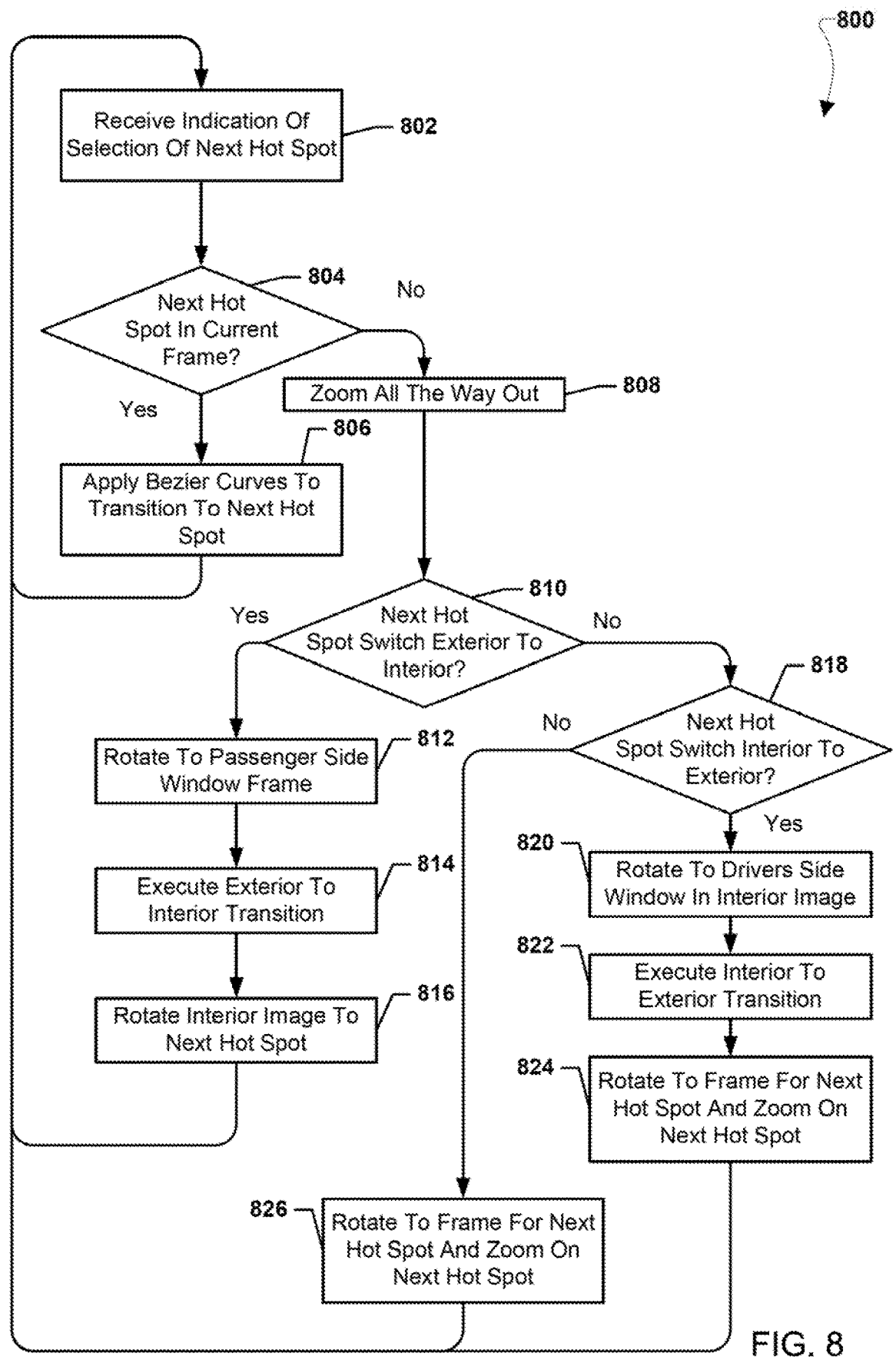
FIG. 8 is a process flow diagram illustrating an embodiment method for animating a virtual display of a vehicle.

FIG. 8 illustrates an embodiment method 800 for animating a virtual display of a vehicle. In an embodiment, the operations of method 800 may performed by the seller server hosting a web site for selling a vehicle including a virtual tour. In block 802 the seller server may receive an indication of a selection of a next hot spot. In an embodiment, an indication of a selection of a next hot spot may be an indication of a click on a hot spot by a customer viewing the vehicle in a virtual tour. In another embodiment, the indication of a selection of a next hot spot may be an indication of a timer expiration for moving between hot spots in an automatic virtual tour. In determination block 804 the seller server may determine whether the next hot spot is in the current frame being displayed. If the next hot spot is in the current frame (i.e., determination block 804="Yes"), in block 806 Biezer curves may be applied to transition to the next hot spot, for example using the Biezer model described above. The method 800 may return to block 802 to receive the next indication of a selection of a next hot spot.

If the next hot spot is not in the current frame (i.e., determination block 804="No"), a transition to another frame/image may be required and in block 808 the seller server may zoom all the way out. In determination block 810 the seller server may determine whether the transition to the next frame requires a switch from the exterior to interior model. If the transition composes a switch from one of the exterior models to the interior model (i.e., determination block 810="Yes"), then seller server may rotate the display to the image/frame with the front passenger side window visible in block 812, where the viewer may then zoom in on the passenger side window. At the point where a camera would hit the glass of the window (if there was a real camera), at block 814 the seller server may execute an exterior to interior transition to use a stock transition to move into the vehicle interior spinner. In block 816 the seller server may rotate the interior image to the next hot spot. For example, the visible image may then rotate to face the target angle for the hot spot. If there is no hot spot, then the target angle may be the center of the front console.

If the next hot spot does not require a switch from an exterior view to an interior view (i.e., determination block 810="No"), in determination block 818 the seller server may determine whether the next hot spot switch is from an interior of the vehicle to an exterior frame. If the transition is from interior to exterior (i.e., determination block 818="Yes"), in block 820 the seller server may rotate the interior image to the driver's side window. In block 822 the seller server may execute a transition from interior to exterior view of the vehicle. In an embodiment, the transition from exterior to interior or vice versa may constitute a functional change to a separate Spinner system of the seller server. In block 824 the seller server may rotate the frame to the next hot spot and zoom on the next hot spot. If the next hot spot does not require an interior to exterior transition (i.e., determination block 818="No"), in block 826 the seller server may rotate the view to the frame for the next hot spot and zoom on the next hot spot.

In an embodiment, if a transition from or to a top-down image is needed, the seller server may employ a stock photographic transient such as a cross fade. In an embodiment, if the seller server is simply transitioning within the Exterior Spinner, from the exterior-doors-open to the exterior-doors-closed, then the source image changes, but the same view and the same position on the Spinner's horizontal axis may be maintained.

In an embodiment, the transition to allow the doors to open or close may be executed by spinning the vehicle 180°, changing the source image or view, and spinning 180° again to reach the same point on the vehicle it was at before, except the exterior source images have changed so the vehicle may be being viewed with the doors and hatches at whatever position they were not at prior to spinning the image. Once this position is reached, then the view may zoom in on the target hot spot. When Bezier curves are not being used, the steps performed above may overlap slightly so that one begins before the other may have finished. This may help to soften the changes from zooming to panning, rotating, or transitioning. Therefore the parabolic path of the virtual camera created so elegantly by the Bezier curves may be approximated here by this overlapping operation of separate, ordered, and regulated steps.

In an embodiment, when the seller server determines whether a transition will be involved somewhere, it may determine whether to reach the next magnification level if it has to zoom out or in. Whenever the system may be zooming in, it may immediately allow the image to pan, or move laterally to reach the target point. If the system requires a zoom out, that pan may be held until there is a command to zoom in.

The combination of the Bezier-based method with the logic system explained above may enable complete transversal of all hot spots on a vehicle without an abrupt transition. If a customer were to transition from the top-down view of the vehicle, there may be no actual photographs to supply a smooth, motion simulated transition from that viewing angle to the side-on view. Instead there may be a traditional, abrupt transition made from the top-down image to a side facing image. Similarly, when the customer performs the transition from the exterior model to the interior model or vice versa, there may be a visual shift from an exterior shot of the window at extreme magnification to the interior panorama oriented from the same window's perspective, but with no magnification. This may also be a significant technical shift as the entire digital constructions of the models differ. There may also be no real visual transition available for use as there is no real camera that may pass through solid glass, which is the effect the customer experiences when using the Interactive Tour. A cross-fade photographic transition program may be used to simulate the transition through the window's glass. Besides those two instances, the Interactive Tour may be able to take a customer through all of the annotations, beginning with the hot spot placed closest to the exact front of the vehicle, and moving through adjacent annotations one at a time in a consistent direction. While the customer may also be able to highlight any feature or imperfection at will on the Spinner. In this manner, the Interactive Tour system may create a natural, easy to operate experience that gives an in-depth view with detailed explanations of the virtual display of the vehicle.

In another aspect, a three-dimensional model of inventory (e.g., vehicles) may be presented on the website via a flash application. The embodiment virtual displays of the vehicle (or model of the vehicle) may be built from images recorded of the actual product itself. When using the online interface, a potential buyer or customer may be able to view from multiple angles the exterior of the vehicle, as well as fully explore the interior.

Figure 9:
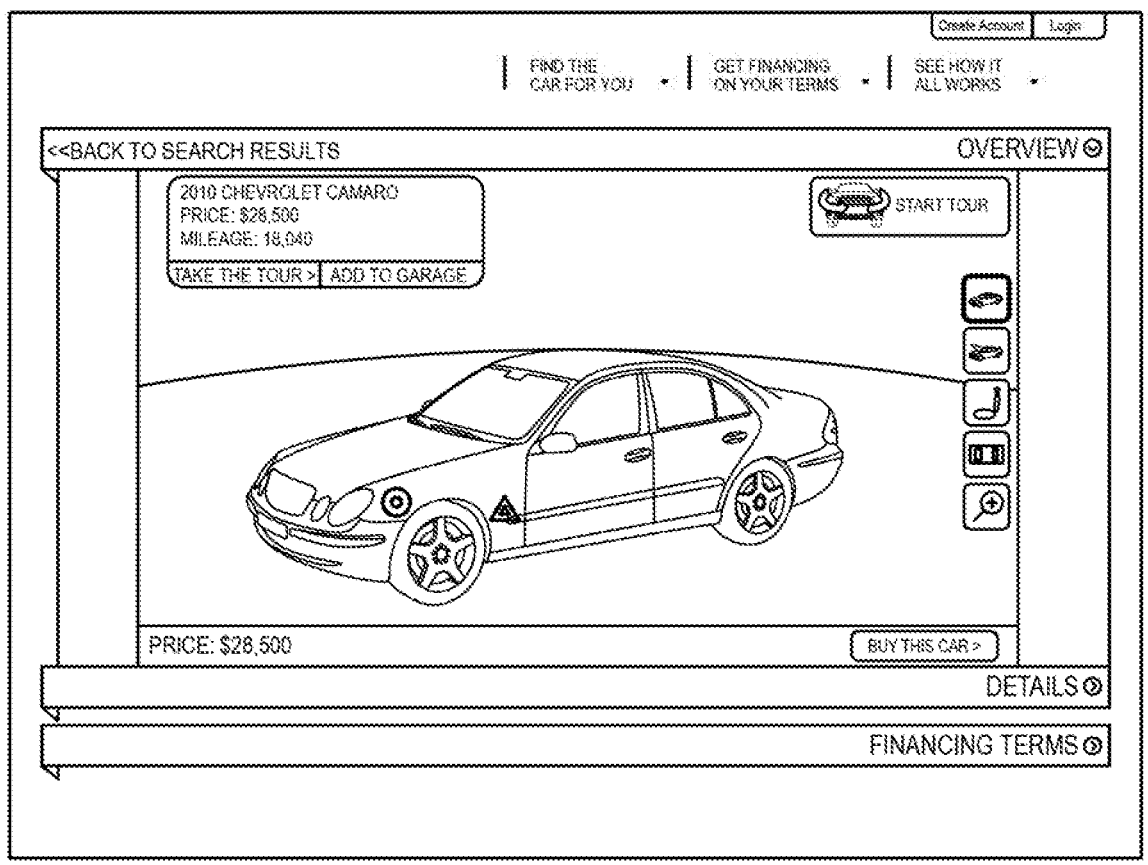
FIG. 9-20 are example screen shots of views of a web portal including a virtual display of a vehicle according to an embodiment.

FIG. 9 illustrates what the user (e.g., customer) may see when using the Spinner on the website. From this page the portion showing the vehicle may be running on a flash application, which means the customer may interact with the image without loading a new webpage. The Spinner may enable the customer to rotate the vehicle, as well as view it in any one of three modes: exterior-doors-closed, exterior-doors-open, and interior. The Spinner may create the illusion of three dimensions in the exterior by condensing a series of two-dimensional images along a single X and Y plane, the order of the photos placed in such a way that moving in one direction on the x axis may make it appear as if the vehicle is rotating. For the interior model, a two-dimensional panoramic image in the format of a Mercator projection may be converted from a photograph measured in pixels to a Canvas measured in degrees, reformatting the image onto a surface which may behave like a sphere but is in fact still only exists in three dimensions.

Figure 10:
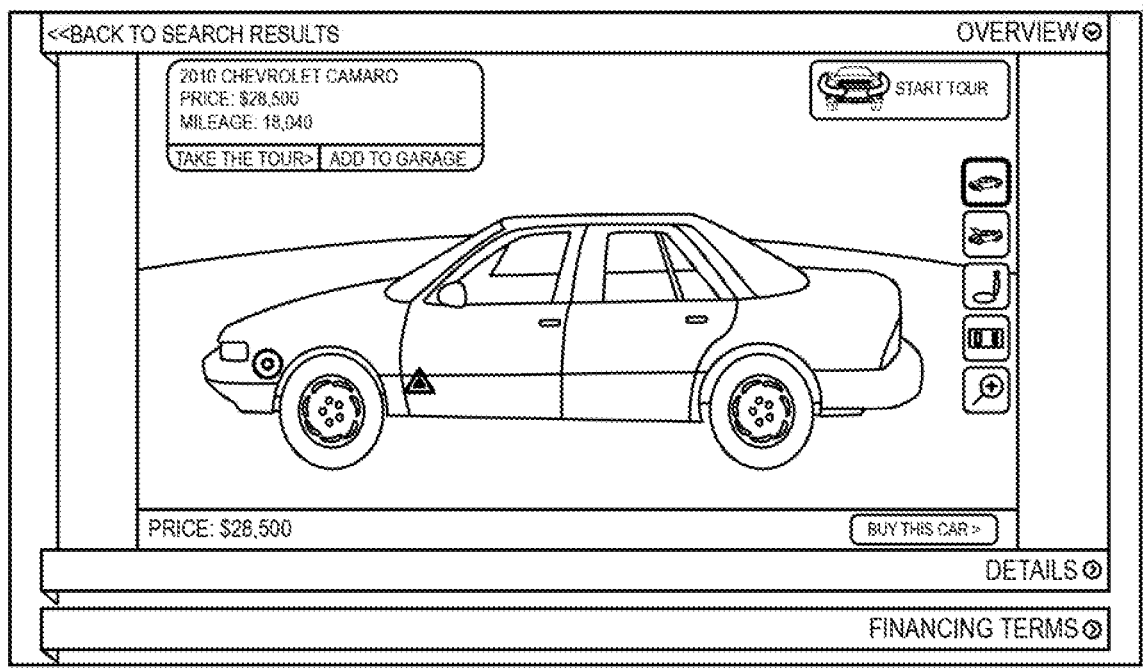
Figure 11:
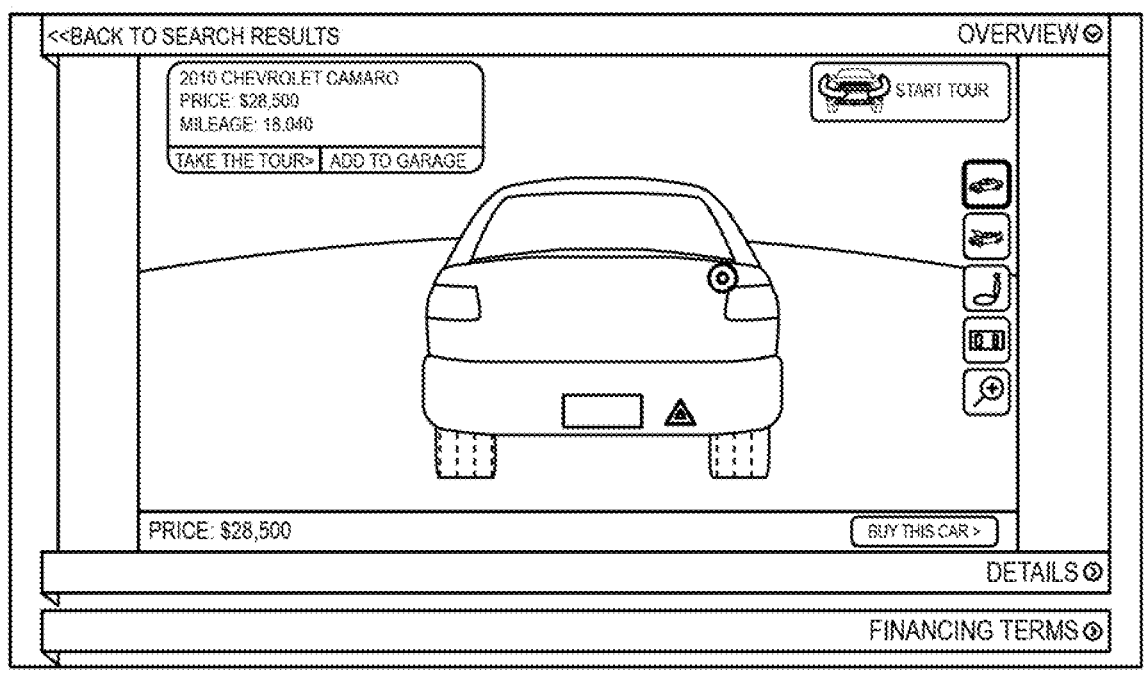

In an embodiment, the Spinner application may display the front image of a vehicle. Important pieces of information about the vehicle, such as the make, model, model year, sales price, and the mileage may be displayed consistently in the upper left hand corner of the Spinner display. On the upper right hand corner may be the link to start the Interactive Tour. This command button may disappear when the tour is started. Along the right side of the viewer, moving from top to bottom may be the buttons to select this exterior view, the exterior view with all doors, windows, and other hatches open, the interior view, the top-down view, and a tab to modify the magnification. Magnification may also be adjusted directly from the input of certain devices, such as the scrolling wheel on the top of a computer mouse. Holding the left mouse button and dragging the mouse may cause the image to move. The illusion of a real three-dimensional vehicle may rotate in the direction the mouse is moving, either clockwise or counterclockwise. For the exterior there may be no vertical movement. The customer may also exit this viewer at any time by a number of options, including selecting the "Details" tab, the "Financing Terms" tab, the Home button, or by hitting the "Buy This Car" button. The customer may make note of hot spot icons on the surface of the vehicle. More of the hot spots may become visible as the customer examines other angles of the vehicle. Clicking on a hot spot may bring up the annotation and initiate a short animation which may bring the customer's view from where they were to the pre-set view of the annotation which may be established in the Visual Annotation Application. As an example, FIG. 10 illustrates a view of the right side of a virtual display of the vehicle according to an embodiment, and FIG. 11 illustrates a view of the rear section of the vehicle. The customer may view more angles, and there may be several more images that fill in the incremental gaps between each of the previous figures.

Figure 12:
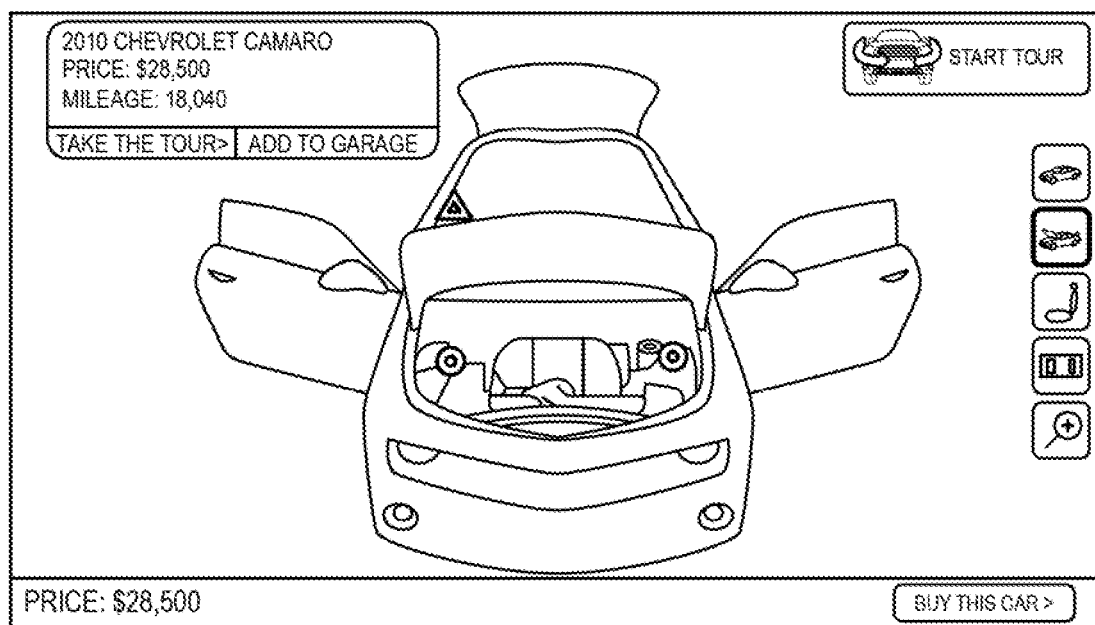

FIG. 12 illustrates a view of the front of the vehicle with the doors, hood, trunk/hatchback/tailgate/cargo door open. Sunroofs may be opened as well if present. This may reveal additional visual detail to the customer as well as grant the customer access to new hot spots which may only visible when the doors and hatches are open. A common example would be the Engine Specifications annotation, which may only visible when the engine is visible. The same universal user interface features may still be present. Notice the change in the vertical angle of the camera. This may be because a different camera was used to record these images of the vehicle. The exact angle may be chosen to optimize the results of photographing process. The same interaction rules for the customer may apply here as did with the vehicle-exterior-closed.

Figure 13:
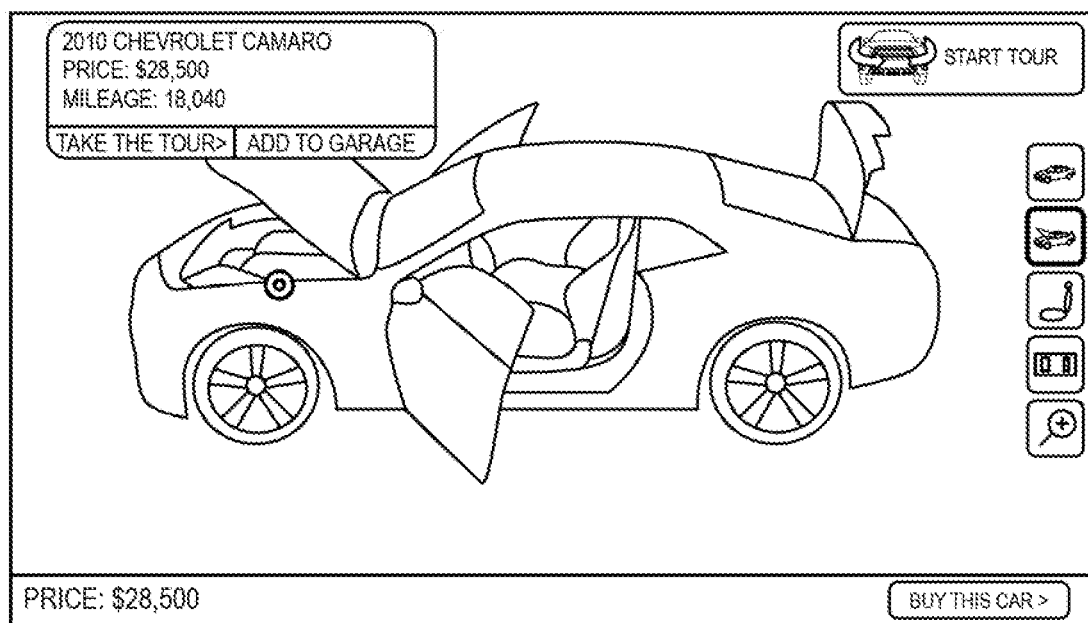

FIG. 13 illustrates an Exterior outside Right Side View. This reveals more details, both at the photographic level, for example may even see some of the interior, but also from the perspective of new annotations which may be linked to those areas of the vehicle that have been revealed by opening up the doors and other hatches. As views change new visual and potential annotation details may become available. Typically cargo space information may be provided in a rear open view in the form of a hot spot.

Figure 14:
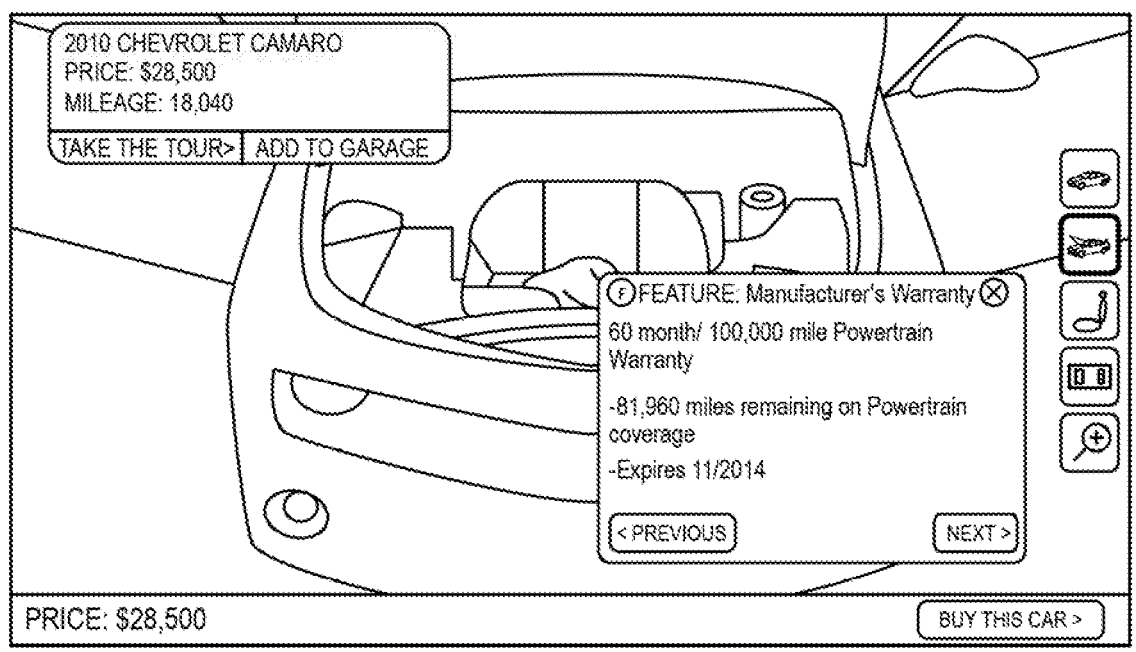

FIG. 14 illustrates an example of an Annotation-Feature. This may be the view the customer would see in the Spinner when beginning the Interactive Tour for this vehicle. The tour may be configured to start with the hot spot located at the front of the vehicle, or the closest one to the exact front. Typically this may be either the Engine Specifications or the Manufacturing Warranty (if available) as the annotator may tend to place those hot spots at the front of the vehicle. There may be no requirement though that this particular annotation has to be the start of the tour. The tour may move from hot spot to hot spot, therefore the viewing angle and the information displayed about the annotated item may be the same regardless if this is a stop on a tour or if the customer manually selected the hot spot from free roaming on the Spinner. In fact, when a customer selects a hot spot, it in effect may start the Interactive Tour system within the flash player, except starting at the customer specified hot spot as opposed to a pre-selected starting hot spot. The customer may be able to move to another hot spot by selecting either the "Previous" or "Next" buttons which will take him or her to the adjacent hot spot in the clockwise or counterclockwise direction respectively. When a hot spot is selected, the information about the annotation may be displayed in a grey-translucent box. There may be a title informing if the annotation is a feature or an imperfection, as well as what the feature or imperfection may be. Additional information may be displayed under the title line in the text box. Otherwise the same user interface features available elsewhere in the Spinner may still be present. The customer may exit the hot spot by selecting the black "x" icon next to the title of the annotation, or by manually decreasing the magnification, which may indicate to the Spinner the customer wants to return to a larger view of the vehicle.

Figure 15:
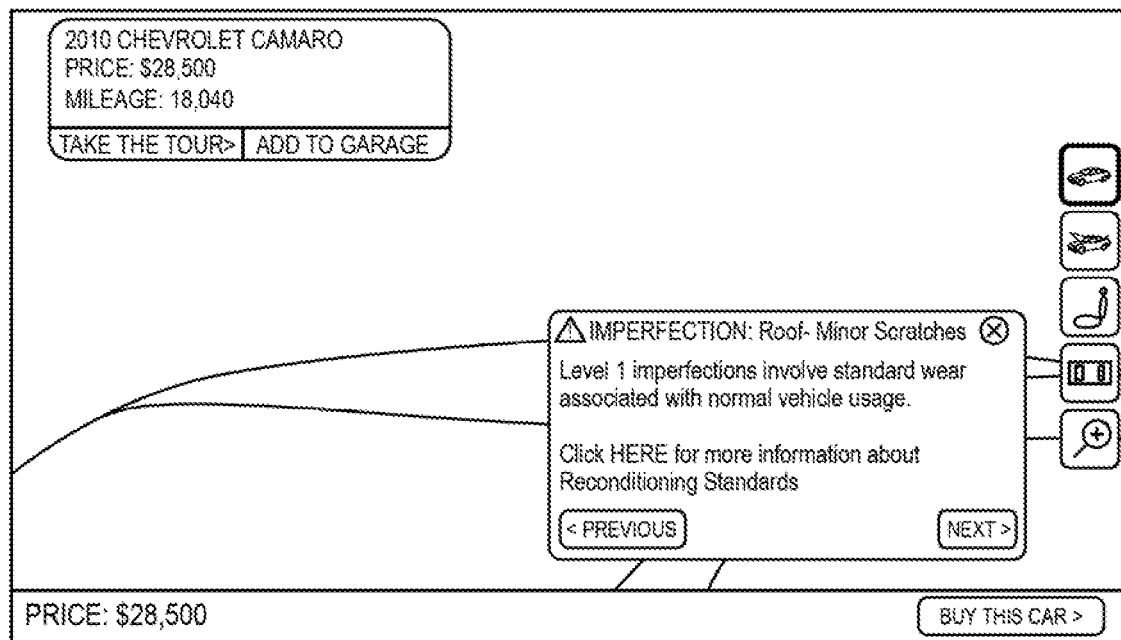
Figure 16:
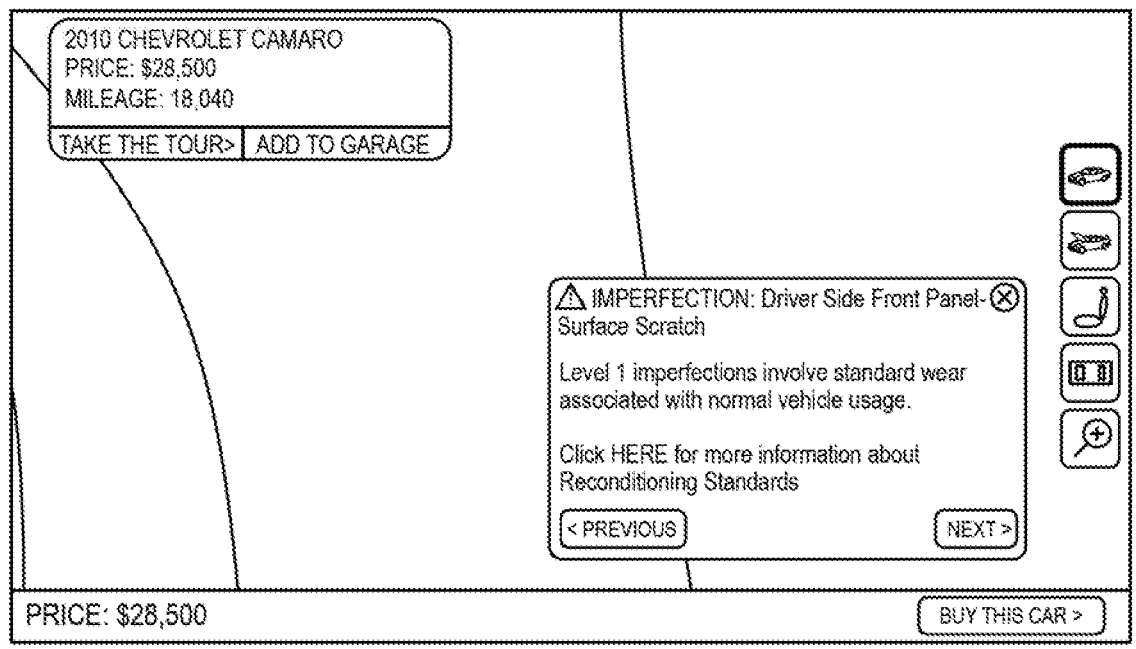

FIG. 15 illustrates an example of an Annotation-Imperfection. For imperfections, the color and icon appearance of the hot spot may be different. Also, imperfections may be described by a standardized scale. The full details about the scale may be listed on a separate webpage and may be reached by clicking on the link apparent in the text box. Otherwise, the same user interface features that were present for the other type of annotation may be here as well, such as the "Previous" and "Next" tour buttons and the exit "x" icon. FIG. 16 illustrates an example of another Annotation-Imperfection. Another example of a different imperfection. Notice the difference in the title of the imperfection as well as the customer angle the annotator created at which to view the hot spot in additional detail.

Figure 17:
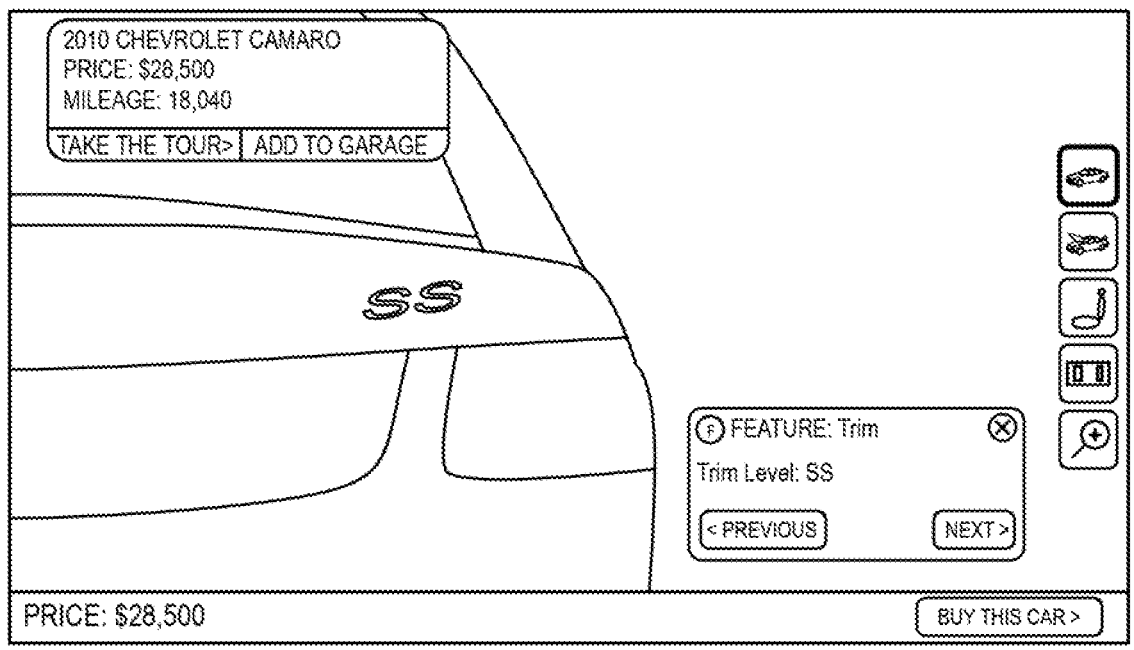

FIG. 17 illustrates an example of an Annotation-Feature. This is another example of an annotated feature for a vehicle. Features may not be described relative to a standard scale. The annotator may offer customized information for each feature for each vehicle. While consistency dictates that most vehicles have the same categories of features: engine specifications, trim level, color schemes; there may be no automated system to populate those categories to meet the unique characteristics that exist for every vehicle in the service provider's inventory. The information may be individually researched and presented. How the annotation may be viewed may also be at the artistic digression of the annotator.

Figure 18:
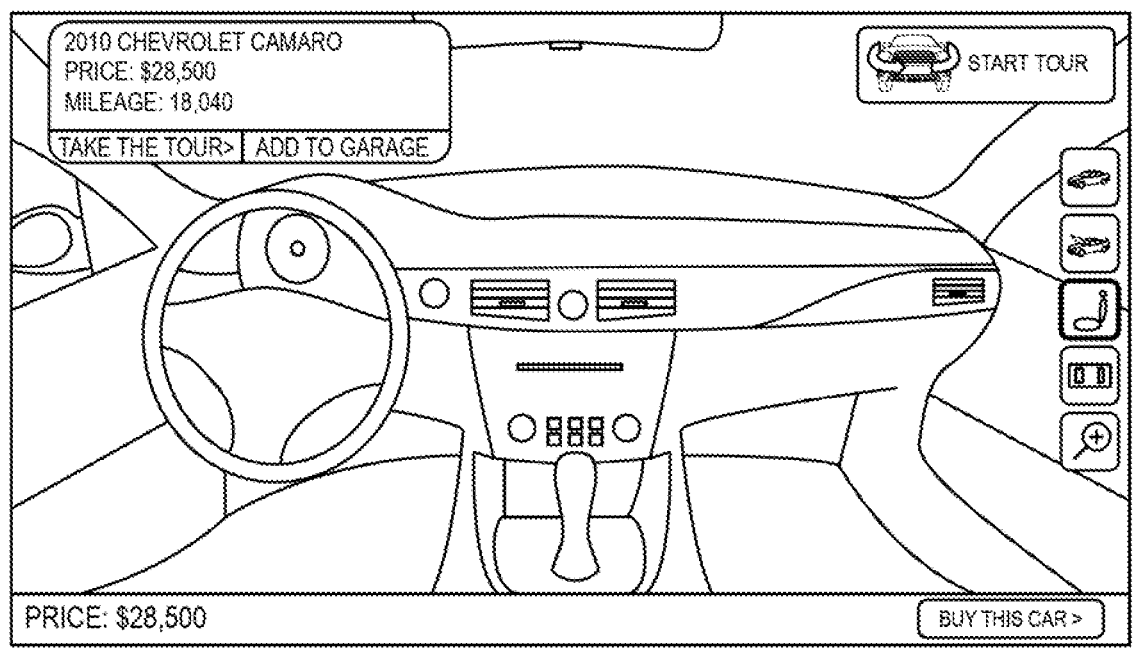
Figure 19:
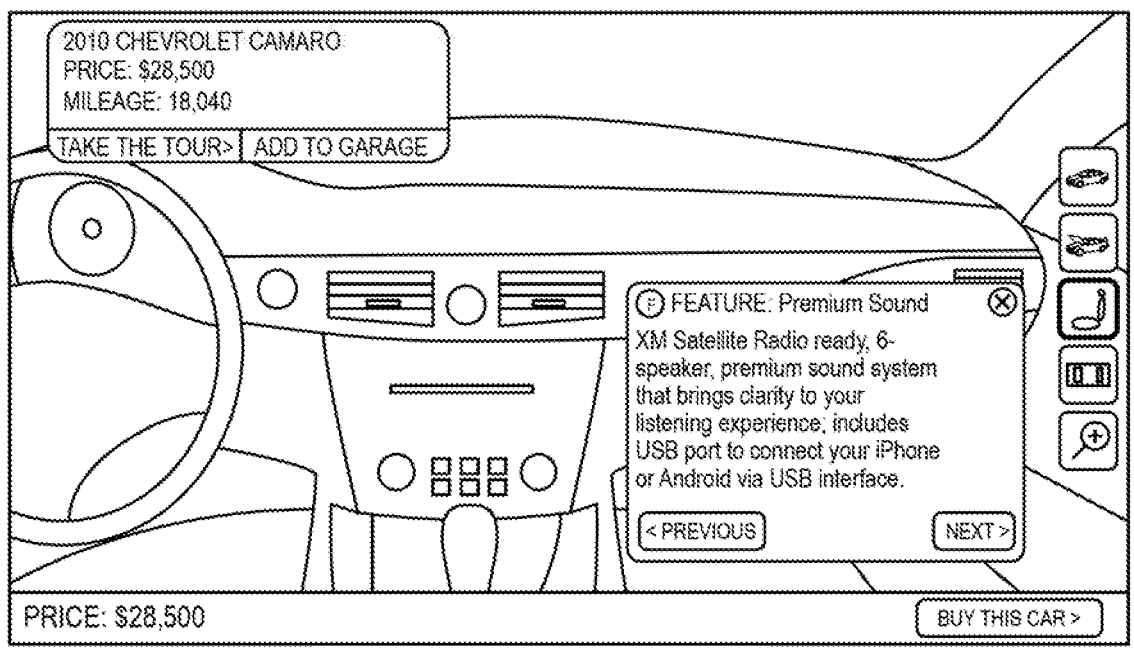
Figure 20:
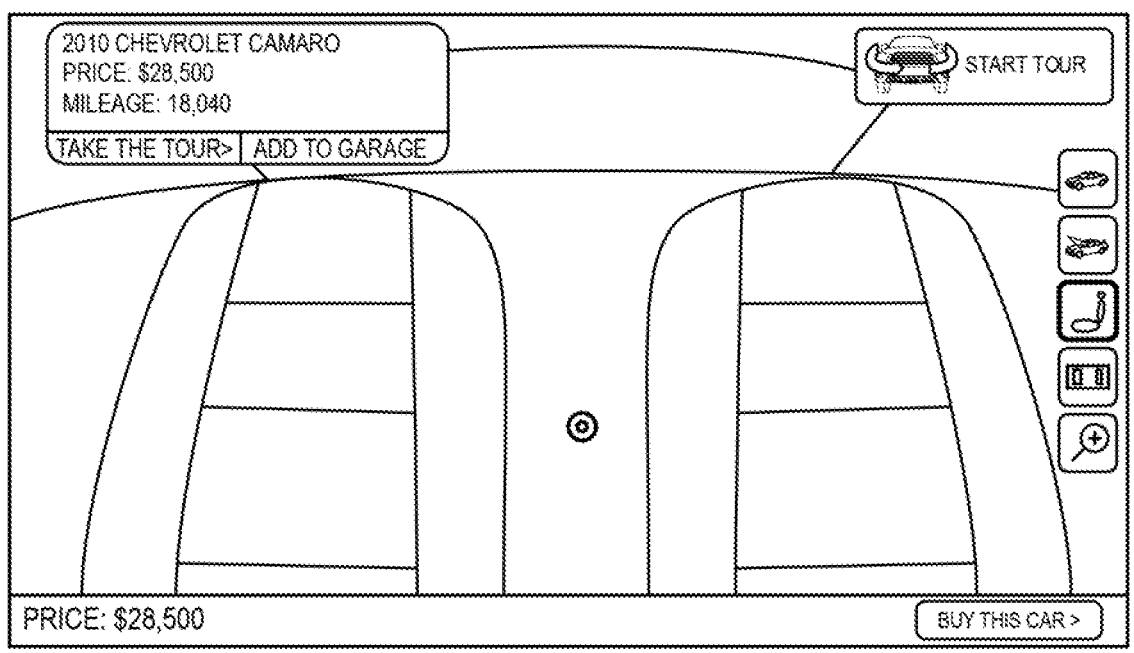

FIG. 18 illustrates an Interior Front View. This may be the standard view presented to the customer when they enter the interior of the vehicle, which activates a specific animation procedure, which may be the same one used when transitioning into the interior during the interactive tour. There may be a slight curvature to the image. This may be due to the unique properties of the Interior Spinner, which may be a similar yet separate system from the Exterior Spinner. The interior may be constructed of a single Mercator projection applied to the two-dimensional illusion of the inside surface of a sphere. The same user interface features that are present in the Exterior Spinner may be available here. The only addition here may be that the customer may be able to move vertically as well as horizontally over the simulated three-dimensional environment. Hot spots may be placed in the interior as well. FIG. 19 illustrates an example of an Interior Annotation-Feature. The user interface may be constructed as viewing a feature in the exterior model. FIG. 20 illustrates an Interior Rear View. This may be the view for the customer looking out the back of the vehicle from the inside.

In an interior view there may be a white dot artificially imposed on the image where the camera would record itself. This may be done for security purposes. Besides the user interface icons and the hot spots, this may be the only digital augmentation made to the image; everything else the customer sees may be from real photographs. In some internal views the control arm for the camera may be visible, but the camera itself may be hidden.

In an embodiment, if the customer wishes, he or she may move vertically within the interior environment as well as horizontally. Thus, they may be able to freely move to view either the floor or ceiling of the vehicle if desired. This may be in contrast with the Exterior Spinner, where the only way to view the vehicle from above may be to select the specific Top-Down icon on the user interface of the Spinner. Recorded from a special camera, the top-down image may be capable of being rotated. It may be one image that the system rotates for the customer. This top down view may be accessible from the appropriate icon on the right side of the screen only.

Figure 21:
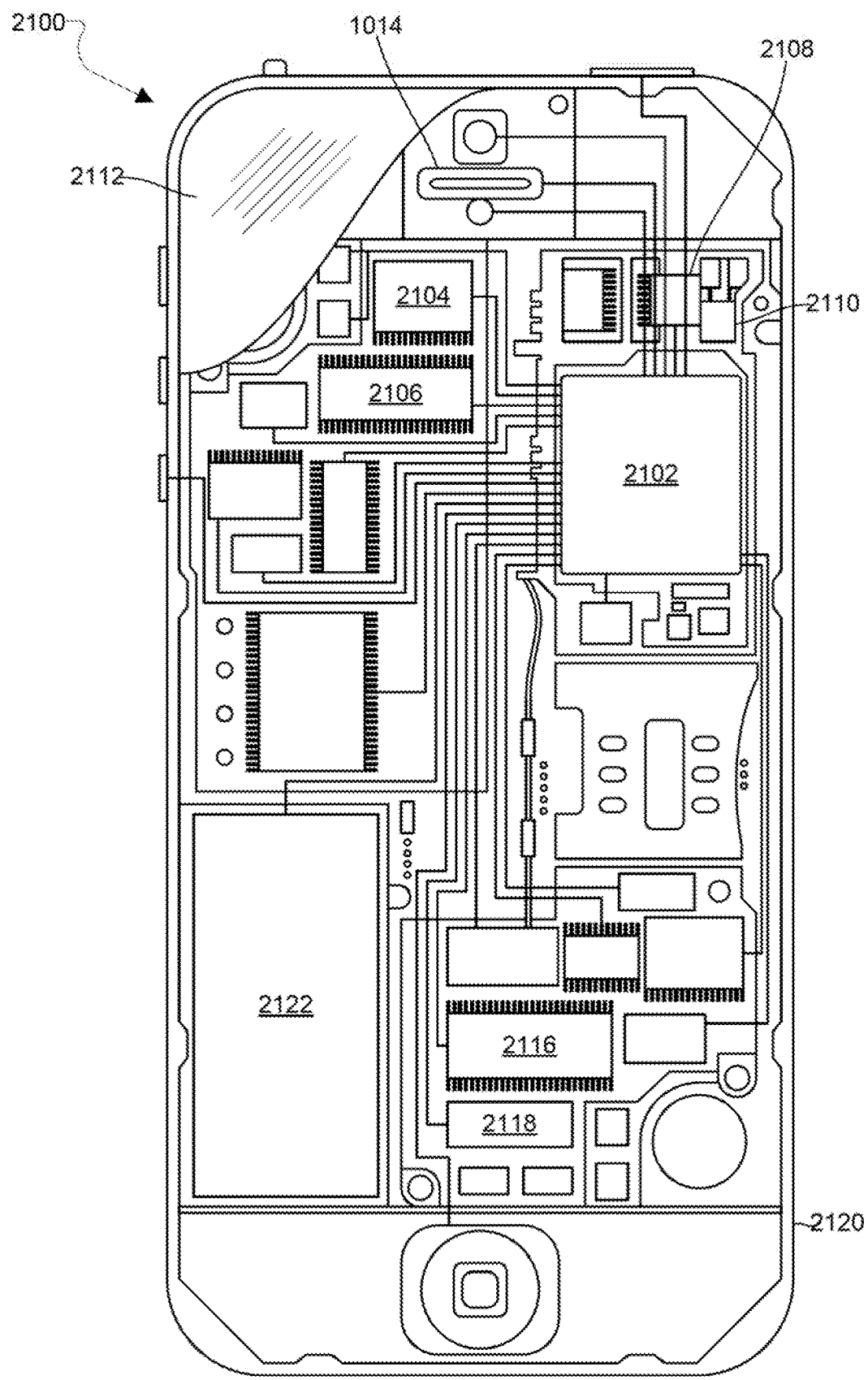
FIG. 21 is a component block diagram of an example computing device suitable for use with the various embodiments.

The various embodiments may be implemented in any of a variety of computing devices, such as a mobile computing device, an example of which is illustrated in FIG. 21. For example, the mobile computing device 2100 may include a processor 2102 coupled to internal memories 2104 and 2106. Internal memories 2104 and 2106 may be volatile or non-volatile memories, and may also be secure and/or encrypted memories, or unsecure and/or unencrypted memories, or any combination thereof. The processor 2102 may also be coupled to a touch screen display 2112, such as a resistive-sensing touch screen, capacitive-sensing touch screen, infrared-sensing touch screen, or the like. Additionally, the display of the receiver device 2100 need not have touch screen capability. The receiver device 2100 may have one or more radio signal transceivers 2108 (e.g., Peanut®, Bluetooth®, Zigbee®, Wi-Fi, RF radio) and antennae 2110, for sending and receiving, coupled to each other and/or to the processor 2102. The mobile computing device 2100 may include a cellular network interface, such as wireless modem chip 2116, that enables communication via a cellular data network (e.g., CDMA, TDMA, GSM, PCS, 3G, 4G, LTE, or any other type of cellular data network) and is coupled to the processor 2102. The receiver device 2100 may include a peripheral device connection interface 2118 coupled to the processor 2102. The peripheral device connection interface 2118 may be singularly configured to accept one type of connection, or multiply configured to accept various types of physical and communication connections, common or proprietary, such as USB, FireWire, Thunderbolt, or PCIe. The peripheral device connection interface 2118 may also be coupled to a similarly configured peripheral device connection port. The mobile computing device 2100 may also include speakers 2114 for providing audio outputs. The receiver device 2100 may also include a housing 2120, constructed of a plastic, metal, or a combination of materials, for containing all or some of the components discussed herein. The receiver device 2100 may include a power source 2122 coupled to the processor 3202, such as a disposable or rechargeable battery. The rechargeable battery may also be coupled to the peripheral device connection port to receive a charging current from a source external to the mobile computing device 2100.

Figure 22:
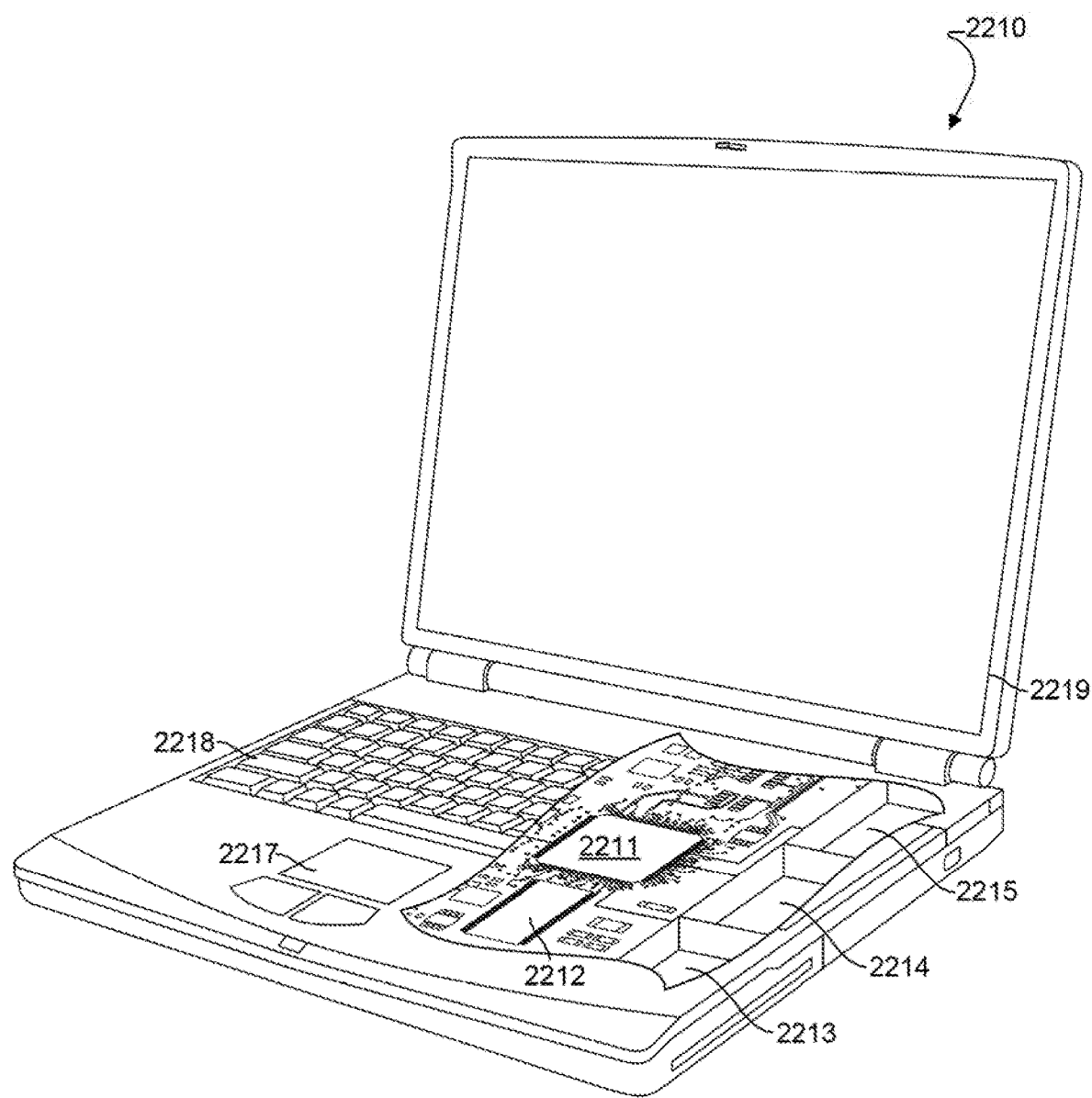
FIG. 22 is a component block diagram of another example computing device suitable for use with the various embodiments.

The various embodiments described above may also be implemented within a variety of computing devices, such as a laptop computer 2210 as illustrated in FIG. 22. Many laptop computers include a touch pad touch surface 2217 that serves as the computer's pointing device, and thus may receive drag, scroll, and flick gestures similar to those implemented on mobile computing devices equipped with a touch screen display and described above. A laptop computer 2210 will typically include a processor 2211 coupled to volatile memory 2212 and a large capacity nonvolatile memory, such as a disk drive 2213 of Flash memory. The laptop computer 2210 may also include a floppy disc drive 2214 and a compact disc (CD) drive 2215 coupled to the processor 2211. The laptop computer 2210 may also include a number of connector ports coupled to the processor 2211 for establishing data connections or receiving external memory devices, such as a USB or FireWire® connector sockets, or other network connection circuits (e.g., interfaces) for coupling the processor 2211 to a network. In a notebook configuration, the computer housing may include the touchpad 2217, the keyboard 2218, and the display 2219 all coupled to the processor 2211. Other configurations of the computing device may include a computer mouse or trackball coupled to the processor (e.g., via a USB input) as are well known, which may also be used in conjunction with the various embodiments.

Figure 23:
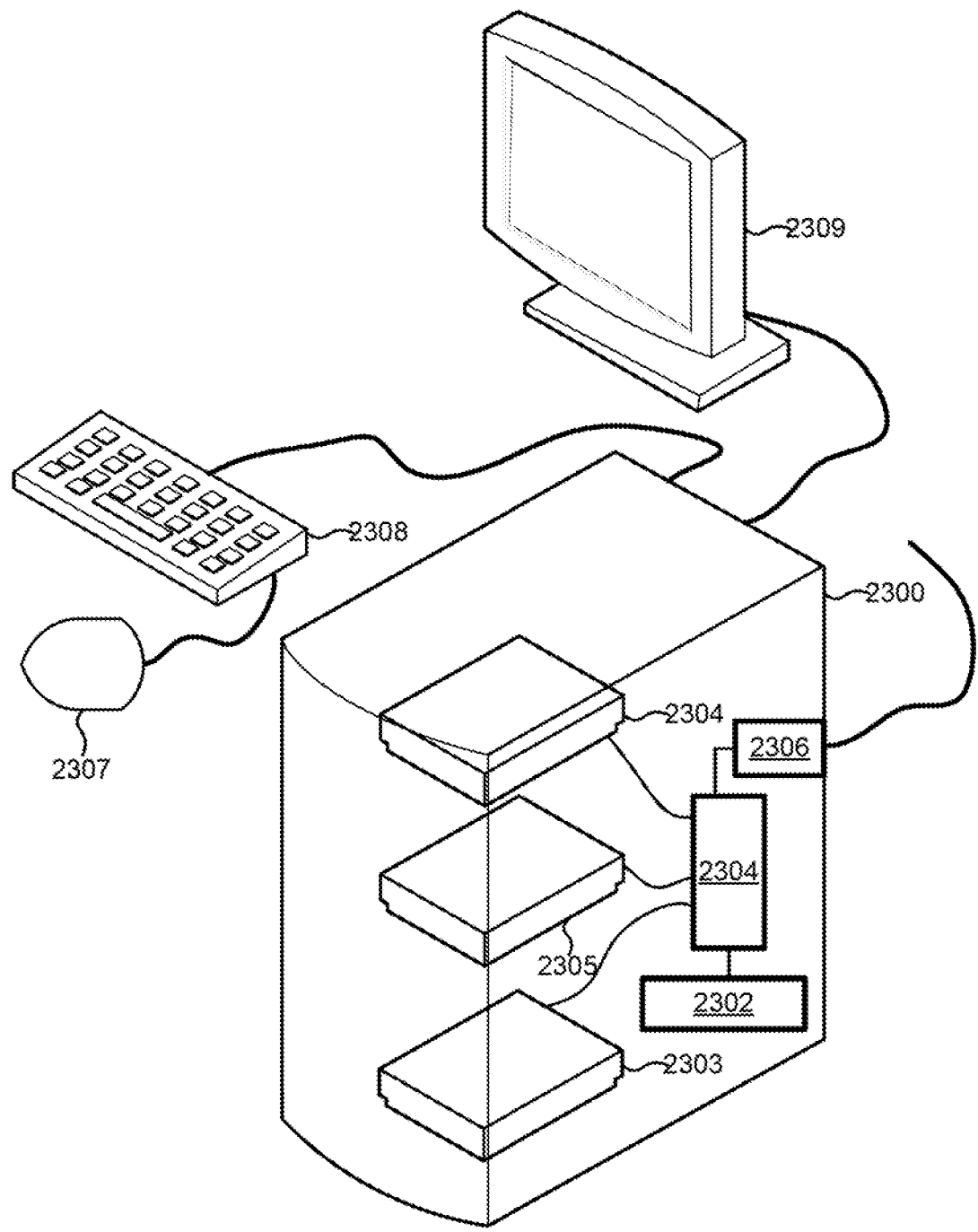
FIG. 23 is a component block diagram of another example computing device suitable of use with the various embodiments.

The various embodiments described above may also be implemented within a variety of computing devices, such as a desktop computer 2300 as illustrated in FIG. 23. A desktop computer 2300 will typically include a processor 2301 coupled to volatile memory 2302 and a large capacity nonvolatile memory, such as a disk drive 2304 of Flash memory. The desktop computer 2300 may also include a floppy disc drive 2305 and a compact disc (CD) drive 2303 coupled to the processor 2701. The desktop computer 2300 may also include a number of connector ports 2306 coupled to the processor 2301 for establishing data connections or receiving external memory devices, such as a USB or FireWire® connector sockets, or other network connection circuits (e.g., interfaces) for coupling the processor 2311 to a network. Additionally, a keyboard 2308, mouse 2307, and display 2319 may all be coupled to the processor 2301.

Figure 24:
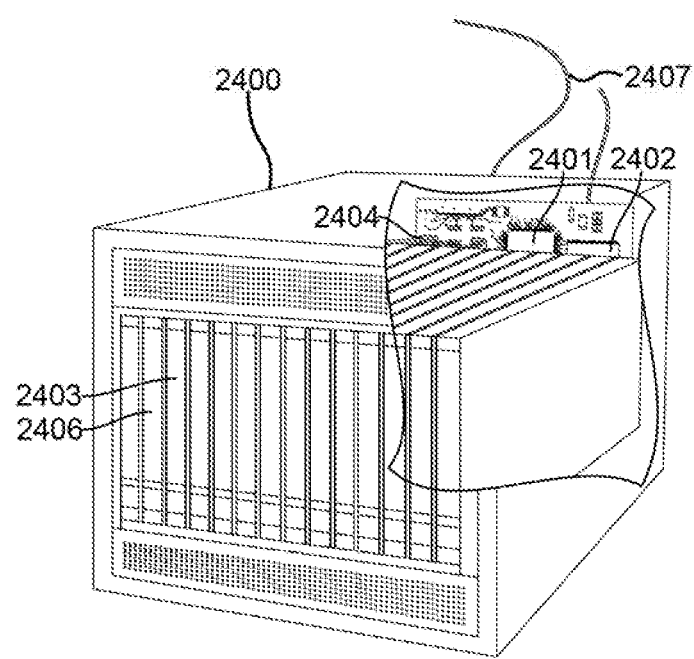
FIG. 24 is a component block diagram of an example server suitable for use with the various embodiments.

The various embodiments may also be implemented on any of a variety of commercially available server devices, such as the server 2400 illustrated in FIG. 24. Such a server 2400 typically includes a processor 2401 coupled to volatile memory 2402 and a large capacity nonvolatile memory, such as a disk drive 2403. The server 2400 may also include a floppy disc drive, compact disc (CD) or DVD disc drive 2406 coupled to the processor 2401. The server 2400 may also include network access ports 2404 (network interfaces) coupled to the processor 2401 for establishing network interface connections with a network 2407, such as a local area network coupled to other computers and servers, the Internet, the public switched telephone network, and/or a cellular data network (e.g., CDMA, TDMA, GSM, PCS, 3G, 4G, LTE, or any other type of cellular data network).

The processors 2102, 2211, 2301, and 2401 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 2104, 2106, 2212, 2213, 2302, 2304, 2402, and 2403 before they are accessed and loaded into the processors 2102, 2211, 2301, and 2401. The processors 2102, 2211, 2301, and 2401 may include internal memory sufficient to store the application software instructions. In many devices the internal memory may be a volatile or nonvolatile memory, such as flash memory, or a mixture of both. For the purposes of this description, a general reference to memory refers to memory accessible by the processors 2102, 2211, 2301, and 2401 including internal memory or removable memory plugged into the device and memory within the processor 2102, 2211, 2301, and 2401 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An item imaging system comprising:
   an image capture area comprising:
     a light located in an open top area between an opaque barrier and an outer structure outside of the image capture area;
     a floor; and
     the opaque barrier between an item placement portion of the image capture area and the light;
   a camera; and
   the outer structure outside of the image capture area, wherein:
     the camera is controlled to capture one or more images of an item in the item placement portion of the image capture area; and the opaque barrier blends in with the floor in the one or more images.

2. The item imaging system of claim 1, wherein:
   the image capture area further comprises a turntable; and
   the turntable is rotated as the camera captures the one or more images of the item.

3. The item imaging system of claim 1, wherein:
   the barrier is configured to block a view of the light from the camera without enclosing the light.

4. The item imaging system of claim 1, wherein the item comprises a vehicle.

5. The item imaging system of claim 1, wherein the one or more images comprise an image of an interior of the item.

6. The item imaging system of claim 1, wherein
   the light is activated in a predefined sequence while the camera to captures the one or more images of the item.

7. The item imaging system of claim 1, wherein one or more light rays emitted from the light are reflected off the outer structure to cast the diffused lighting.

8. The item imaging system of claim 1, wherein:
   the light comprises a plurality of lights; and
   the plurality of lights is located around the item placement portion of the image capture area.

9. The item imaging system of claim 1, wherein the outer structure comprises one or more of:
   at least a portion of a dome;
   at least a portion of a cone;
   at least a portion of a sphere; or
   at least a portion of a flat surface.

10. The item imaging system of claim 1, wherein the light is configured to cast diffused lighting onto the item placement portion of the image capture area.

11. A method comprising:
    providing an image capture area, comprising:
      a light located in an open top area between an opaque barrier and an outer structure outside of the image capture area;
      a floor; and
      the opaque barrier between an item placement portion of the image capture area and the light;
    providing a camera; and
    controlling the camera to capture one or more images of an item in the item placement portion of the image capture area, wherein the opaque barrier blends in with the floor in the one or more images.

12. The method of claim 11, wherein:
    the image capture area further comprises a turntable; and
    the method further comprises:
      rotating the turntable as the camera captures the one or more images of the item.

13. The method of claim 11 further comprising:
    blocking a view of the light from the camera using the barrier.

14. The method of claim 11, wherein the item comprises a vehicle.

15. The method of claim 11, wherein controlling the camera to capture the one or more images of the item comprises:
    controlling the camera to capture an image of an interior of the item.

16. The method of claim 11 further comprising:
    activating the light in a predefined sequence while controlling the camera to capture the one or more images of the item.

17. The method of claim 11, wherein one or more light rays emitted from the light are reflected off the outer structure to cast the diffused lighting.

18. The method of claim 11, wherein:
    the light comprises a plurality of lights; and
    the plurality of lights is arranged in a circle around the item placement portion of the image capture area.

19. The method of claim 11, wherein the outer structure comprises one or more of:
    at least a portion of a dome;
    at least a portion of a cone;
    at least a portion of a sphere; or
    at least a portion of a flat surface.

20. The method of claim 11, wherein the light is configured to cast diffused lighting onto the item placement portion of the image capture area.

* * * * *